United States Patent
Suh et al.

(10) Patent No.: US 12,053,346 B2
(45) Date of Patent: Aug. 6, 2024

(54) INDIRECT ORTHODONTIC BONDING SYSTEMS AND METHODS

(71) Applicant: Swift Health Systems Inc., Irvine, CA (US)

(72) Inventors: Monica Y. Suh, Irvine, CA (US); Shreya Akkenapally, Irvine, CA (US); Scott C. Schwartz, Irvine, CA (US); Duy M. Do, Irvine, CA (US); Allen Huynh, Irvine, CA (US)

(73) Assignee: Swift Health Systems Inc., Irvine, CA (US)

( * ) Notice: Subject to any disclaimer, the term of this patent is extended or adjusted under 35 U.S.C. 154(b) by 952 days.

(21) Appl. No.: 17/084,383

(22) Filed: Oct. 29, 2020

(65) Prior Publication Data

US 2021/0128275 A1 May 6, 2021

Related U.S. Application Data

(60) Provisional application No. 62/928,587, filed on Oct. 31, 2019.

(51) Int. Cl.
*A61C 7/14* (2006.01)
*A61C 9/00* (2006.01)
(Continued)

(52) U.S. Cl.
CPC .............. *A61C 7/146* (2013.01); *A61C 9/004* (2013.01); *B29C 64/393* (2017.08); *B33Y 50/02* (2014.12);
(Continued)

(58) Field of Classification Search
CPC ........... A61C 7/146; A61C 7/08; A61C 9/004; B33Y 50/02; B33Y 80/00; B29C 64/393; B29L 2031/753
See application file for complete search history.

(56) References Cited

U.S. PATENT DOCUMENTS

| 1,005,131 A | 10/1911 | Angle et al. |
| 1,108,493 A | 8/1914 | Federspiel |

(Continued)

FOREIGN PATENT DOCUMENTS

| CN | 1372872 | 10/2002 |
| CN | 201079455 | 7/2008 |

(Continued)

OTHER PUBLICATIONS

Coro, Jorge C. et al., "MEAW Therapy" MEAW Therapy-Orthodontic Products, accessed via http://www.orthodonticproductsonline.com/2012/11/meaw-therapy/ on Mar. 14, 2016, published Nov. 12, 2012 in 6 pages.

(Continued)

*Primary Examiner* — Yogesh P Patel
(74) *Attorney, Agent, or Firm* — Knobbe, Martens, Olson & Bear, LLP

(57) ABSTRACT

Systems and methods for fabricating indirect bonding trays are disclosed. Digital models of a patient's teeth can be created with digital brackets positioned on the digital model of a patient's teeth. Digital models of indirect bonding trays can be created to retain and transfer the brackets. The indirect bonding trays can be 3-D printed with wells that the functional brackets can be placed into and thereafter transferred to the patient. The 3-D printed indirect bonding tray can comprise two resins, with one resin forming the tray and another resin forming a functional feature.

14 Claims, 18 Drawing Sheets

(51) Int. Cl.
  *B29C 64/393* (2017.01)
  *B33Y 50/02* (2015.01)
  *B33Y 80/00* (2015.01)
  *B29L 31/00* (2006.01)

(52) U.S. Cl.
  CPC ......... *B33Y 80/00* (2014.12); *B29L 2031/753* (2013.01)

(56) References Cited

U.S. PATENT DOCUMENTS

| | | | |
|---|---|---|---|
| 1,307,382 | A | 6/1919 | Stanton |
| 1,323,141 | A | 11/1919 | Young |
| 1,429,749 | A | 9/1922 | Maeulen et al. |
| 1,638,006 | A | 2/1926 | Aderer |
| 2,257,069 | A | 9/1941 | Peak |
| 2,495,692 | A | 1/1950 | Brusse |
| 2,524,763 | A | 10/1950 | Brusse |
| 2,582,230 | A | 1/1952 | Brusse |
| 3,256,602 | A | 6/1966 | Broussard |
| 3,262,207 | A | 7/1966 | Kesling |
| 3,374,542 | A | 3/1968 | Moylan, Jr. |
| 3,464,113 | A | 9/1969 | Silverman et al. |
| 3,593,421 | A | 7/1971 | Brader |
| 3,600,808 | A | 8/1971 | Reeve |
| 3,683,502 | A | 8/1972 | Wallshein |
| 3,691,635 | A | 9/1972 | Wallshein |
| 3,762,050 | A | 10/1973 | Dal Pont |
| 3,765,091 | A | 10/1973 | Northcutt |
| 3,878,610 | A | 4/1975 | Coscina |
| 3,936,938 | A | 2/1976 | Northcutt |
| 3,946,488 | A | 3/1976 | Miller et al. |
| 3,949,477 | A | 4/1976 | Cohen et al. |
| 3,975,823 | A | 8/1976 | Sosnay |
| 4,103,423 | A | 8/1978 | Kessel |
| 4,171,568 | A | 10/1979 | Forster |
| 4,192,070 | A | 3/1980 | Lemchen et al. |
| 4,193,195 | A | 3/1980 | Merkel et al. |
| 4,197,643 | A | 4/1980 | Burstone et al. |
| 4,268,250 | A | 5/1981 | Reeve |
| 4,330,273 | A | 5/1982 | Kesling |
| 4,354,833 | A | 10/1982 | Fujita |
| 4,354,834 | A | 10/1982 | Wilson |
| 4,382,781 | A | 5/1983 | Grossman |
| 4,385,890 | A | 5/1983 | Klein |
| 4,412,819 | A | 11/1983 | Cannon |
| 4,424,033 | A | 1/1984 | Wool |
| 4,436,510 | A | 3/1984 | Klein |
| 4,479,779 | A | 10/1984 | Wool |
| 4,483,674 | A | 11/1984 | Schütz |
| 4,490,112 | A | 12/1984 | Tanaka et al. |
| 4,501,554 | A | 2/1985 | Hickham |
| 4,516,938 | A | 5/1985 | Hall |
| 4,533,320 | A | 8/1985 | Piekarsky |
| 4,561,844 | A | 12/1985 | Bates |
| 4,580,976 | A | 4/1986 | O'Meara |
| 4,582,487 | A | 4/1986 | Creekmore |
| 4,585,414 | A | 4/1986 | Kottermann |
| 4,592,725 | A | 6/1986 | Goshgarian |
| 4,634,662 | A | 1/1987 | Rosenberg |
| 4,656,860 | A | 4/1987 | Orthuber et al. |
| 4,659,310 | A | 4/1987 | Kottermann |
| 4,664,626 | A | 5/1987 | Kesling |
| 4,674,978 | A | 6/1987 | Acevedo |
| 4,676,747 | A | 6/1987 | Kesling |
| 4,725,229 | A | 2/1988 | Miller |
| 4,797,093 | A | 1/1989 | Bergersen |
| 4,797,095 | A | 1/1989 | Armstrong et al. |
| 4,838,787 | A | 6/1989 | Lerner |
| 4,842,514 | A | 6/1989 | Kesling |
| 4,872,449 | A | 10/1989 | Beeuwkes |
| 4,881,896 | A | 11/1989 | Bergersen |
| 4,892,479 | A | 1/1990 | McKenna |
| 4,897,035 | A | 1/1990 | Green |
| 4,900,251 | A | 2/1990 | Andreasen |
| 4,978,323 | A | 12/1990 | Freedman |
| 5,011,405 | A | 4/1991 | Lemchen |
| 5,017,133 | A | 5/1991 | Miura |
| 5,044,947 | A | 9/1991 | Sachdeva et al. |
| 5,055,039 | A | 10/1991 | Abbatte et al. |
| 5,092,768 | A | 3/1992 | Korn |
| 5,114,339 | A | 5/1992 | Guis |
| 5,123,838 | A | 6/1992 | Cannon |
| 5,127,828 | A | 7/1992 | Suyama |
| 5,131,843 | A | 7/1992 | Hilgers et al. |
| 5,154,606 | A | 10/1992 | Wildman |
| 5,174,754 | A | 12/1992 | Meritt |
| 5,176,514 | A | 1/1993 | Viazis |
| 5,176,618 | A | 1/1993 | Freedman |
| 5,238,404 | A | 8/1993 | Andreiko |
| 5,242,304 | A | 9/1993 | Truax et al. |
| 5,248,257 | A | 9/1993 | Cannon |
| 5,259,760 | A | 11/1993 | Orikasa |
| 5,312,247 | A | 5/1994 | Sachdeva et al. |
| 5,344,315 | A | 9/1994 | Hanson |
| 5,368,478 | A | 11/1994 | Andreiko |
| 5,380,197 | A | 1/1995 | Hanson |
| 5,399,087 | A | 3/1995 | Arndt |
| 5,431,562 | A | 7/1995 | Andreiko |
| 5,447,432 | A | 9/1995 | Andreiko |
| 5,454,717 | A | 10/1995 | Andreiko |
| RE35,169 | E | 3/1996 | Lemchen et al. |
| 5,516,284 | A | 5/1996 | Wildman |
| 5,556,277 | A | 9/1996 | Yawata et al. |
| 5,624,258 | A | 4/1997 | Wool |
| 5,630,715 | A | 5/1997 | Voudouris |
| 5,683,243 | A | 11/1997 | Andreiko |
| 5,683,245 | A | 11/1997 | Sachdeva et al. |
| 5,722,827 | A | 3/1998 | Allesee |
| 5,727,941 | A | 3/1998 | Kesling |
| 5,816,800 | A | 10/1998 | Brehm |
| 5,820,370 | A | 10/1998 | Brosius |
| 5,863,198 | A | 1/1999 | Doyle |
| 5,890,893 | A | 4/1999 | Heiser |
| 5,971,754 | A | 10/1999 | Sondhi et al. |
| 5,975,893 | A | 11/1999 | Chishti et al. |
| 5,993,208 | A | 11/1999 | Jonjic |
| 6,015,289 | A | 1/2000 | Andreiko |
| 6,036,489 | A | 3/2000 | Brosius |
| 6,042,374 | A | 3/2000 | Farzin-Nia et al. |
| 6,086,364 | A | 7/2000 | Brunson |
| 6,089,861 | A | 7/2000 | Kelly |
| 6,095,809 | A | 8/2000 | Kelly et al. |
| 6,099,304 | A | 8/2000 | Carter |
| 6,123,544 | A | 9/2000 | Cleary |
| 6,183,250 | B1 | 2/2001 | Kanno et al. |
| 6,190,166 | B1 | 2/2001 | Sasakura |
| 6,196,839 | B1 | 3/2001 | Ross |
| 6,213,767 | B1 | 4/2001 | Dixon et al. |
| 6,217,325 | B1 | 4/2001 | Chishti et al. |
| 6,227,850 | B1 | 5/2001 | Chishti et al. |
| 6,244,861 | B1 | 6/2001 | Andreiko |
| 6,250,918 | B1 | 6/2001 | Sachdeva et al. |
| 6,258,118 | B1 | 7/2001 | Baum et al. |
| 6,315,553 | B1 | 11/2001 | Sachdeva et al. |
| 6,318,994 | B1 | 11/2001 | Chishti et al. |
| 6,318,995 | B1 | 11/2001 | Sachdeva et al. |
| 6,334,853 | B1 | 1/2002 | Kopelman et al. |
| 6,350,120 | B1 | 2/2002 | Sachdeva et al. |
| 6,358,045 | B1 | 3/2002 | Farzin-Nia et al. |
| 6,371,761 | B1 | 4/2002 | Cheang et al. |
| 6,375,458 | B1 | 4/2002 | Moorleghem et al. |
| 6,394,801 | B2 | 5/2002 | Chishti et al. |
| 6,398,548 | B1 | 6/2002 | Muhammad et al. |
| 6,413,084 | B1 | 6/2002 | Rubbert et al. |
| 6,431,870 | B1 | 8/2002 | Sachdeva |
| 6,450,807 | B1 | 9/2002 | Chishti et al. |
| 6,464,495 | B1 | 10/2002 | Voudouris |
| 6,464,496 | B1 | 10/2002 | Sachdeva et al. |
| 6,471,511 | B1 | 10/2002 | Chishti et al. |
| 6,471,512 | B1 | 10/2002 | Sachdeva et al. |
| 6,512,994 | B1 | 1/2003 | Sachdeva |
| 6,514,074 | B1 | 2/2003 | Chishti et al. |
| 6,532,299 | B1 | 3/2003 | Sachdeva et al. |

(56) References Cited

U.S. PATENT DOCUMENTS

| | | |
|---|---|---|
| 6,540,512 B1 | 4/2003 | Sachdeva et al. |
| 6,554,613 B1 | 4/2003 | Sachdeva et al. |
| 6,572,693 B1 | 6/2003 | Wu et al. |
| 6,582,226 B2 | 6/2003 | Jordan et al. |
| 6,587,828 B1 | 7/2003 | Sachdeva |
| 6,595,774 B1 | 7/2003 | Risse |
| 6,554,611 B2 | 8/2003 | Chishti et al. |
| 6,602,070 B2 | 8/2003 | Miller et al. |
| 6,612,143 B1 | 9/2003 | Butscher et al. |
| 6,616,444 B2 | 9/2003 | Andreiko |
| 6,626,666 B2 | 9/2003 | Chishti et al. |
| 6,629,840 B2 | 10/2003 | Chishti et al. |
| 6,632,089 B2 | 10/2003 | Rubbert |
| 6,648,640 B2 | 11/2003 | Rubbert |
| 6,663,385 B2 | 12/2003 | Tepper |
| 6,679,700 B2 | 1/2004 | McGann |
| 6,682,344 B1 | 1/2004 | Stockstill |
| 6,685,469 B2 | 2/2004 | Chishti et al. |
| 6,685,470 B2 | 2/2004 | Chishti et al. |
| 6,688,885 B1 | 2/2004 | Sachdeva et al. |
| 6,699,037 B2 | 3/2004 | Chishti et al. |
| 6,702,575 B2 | 3/2004 | Hilliard |
| 6,705,863 B2 | 3/2004 | Phan et al. |
| 6,722,878 B2 | 4/2004 | Graham |
| 6,722,880 B2 | 4/2004 | Chishti et al. |
| 6,728,423 B1 | 4/2004 | Rubbert et al. |
| 6,729,876 B2 | 5/2004 | Chishti et al. |
| 6,732,558 B2 | 5/2004 | Butscher et al. |
| 6,733,285 B2 | 5/2004 | Puttler et al. |
| 6,733,287 B2 | 5/2004 | Wilkerson |
| 6,733,288 B2 | 5/2004 | Vallittu et al. |
| 6,736,638 B1 | 5/2004 | Sachdeva et al. |
| 6,738,508 B1 | 5/2004 | Rubbert et al. |
| 6,739,869 B1 | 5/2004 | Taub et al. |
| 6,744,914 B1 | 6/2004 | Rubbert et al. |
| 6,744,932 B1 | 6/2004 | Rubbert et al. |
| 6,746,241 B2 | 6/2004 | Townsend-Hansen |
| 6,755,064 B2 | 6/2004 | Butscher |
| 6,771,809 B1 | 8/2004 | Rubbert et al. |
| 6,776,614 B2 | 8/2004 | Wiechmann |
| 6,830,450 B2 | 12/2004 | Knopp et al. |
| 6,845,175 B2 | 1/2005 | Kopelman et al. |
| 6,846,179 B2 | 1/2005 | Chapouland |
| 6,851,949 B1 | 2/2005 | Sachdeva et al. |
| 6,860,132 B2 | 3/2005 | Butscher |
| 6,893,257 B2 | 5/2005 | Kelly |
| 6,928,733 B2 | 8/2005 | Rubbert et al. |
| 6,948,931 B2 | 9/2005 | Chishti et al. |
| 6,960,079 B2 | 11/2005 | Brennan et al. |
| 6,971,873 B2 | 12/2005 | Sachdeva |
| 6,976,627 B1 | 12/2005 | Culp et al. |
| 6,988,889 B2 | 1/2006 | Abels |
| 7,008,221 B2 | 3/2006 | McGann |
| 7,013,191 B2 | 3/2006 | Rubbert |
| 7,020,963 B2 | 4/2006 | Cleary et al. |
| 7,029,275 B2 | 4/2006 | Rubbert |
| 7,033,171 B2 | 4/2006 | Wilkerson |
| 7,037,107 B2 | 5/2006 | Yamamoto |
| 7,056,115 B2 | 6/2006 | Phan et al. |
| 7,063,531 B2 | 6/2006 | Maijer et al. |
| 7,068,836 B1 | 6/2006 | Rubbert et al. |
| 7,076,980 B2 | 7/2006 | Butscher |
| 7,077,646 B2 | 7/2006 | Hilliard |
| 7,077,647 B2 | 7/2006 | Choi et al. |
| 7,080,979 B2 | 7/2006 | Rubbert et al. |
| 7,092,107 B2 | 8/2006 | Babayoff et al. |
| 7,094,053 B2 | 8/2006 | Andreiko |
| 7,112,065 B2 | 9/2006 | Kopelman et al. |
| 7,125,248 B2 | 10/2006 | Phan et al. |
| 7,134,874 B2 | 11/2006 | Chishti et al. |
| 7,137,812 B2 | 11/2006 | Cleary et al. |
| 7,155,373 B2 | 12/2006 | Jordan et al. |
| 7,156,661 B2 | 1/2007 | Choi et al. |
| 7,160,110 B2 | 1/2007 | Imgrund et al. |
| 7,168,950 B2 | 1/2007 | Cinader, Jr. et al. |
| 7,172,417 B2 | 2/2007 | Sporbert et al. |
| 7,175,428 B2 | 2/2007 | Nicholson |
| 7,186,115 B2 | 3/2007 | Goldberg et al. |
| 7,188,421 B2 | 3/2007 | Cleary et al. |
| 7,201,574 B1 | 4/2007 | Wiley |
| 7,204,690 B2 | 4/2007 | Hanson et al. |
| 7,214,056 B2 | 5/2007 | Stockstill |
| 7,229,282 B2 | 6/2007 | Andreiko |
| 7,234,934 B2 | 6/2007 | Rosenberg |
| 7,234,936 B2 | 6/2007 | Lai |
| 7,234,937 B2 | 6/2007 | Sachdeva et al. |
| 7,240,528 B2 | 7/2007 | Weise et al. |
| 7,244,121 B2 | 7/2007 | Brosius |
| 7,245,977 B1 | 7/2007 | Simkins |
| 7,252,506 B2 | 8/2007 | Lai |
| 7,267,545 B2 | 9/2007 | Oda |
| 7,283,891 B2 | 10/2007 | Butscher |
| 7,296,996 B2 | 11/2007 | Sachdeva |
| 7,335,021 B2 | 2/2008 | Nikodem |
| 7,347,688 B2 | 3/2008 | Kopelman et al. |
| 7,354,268 B2 | 4/2008 | Raby et al. |
| 7,357,634 B2 | 4/2008 | Knopp |
| 7,361,017 B2 | 4/2008 | Sachdeva |
| 7,364,428 B2 | 4/2008 | Cinader, Jr. et al. |
| 7,404,714 B2 | 7/2008 | Cleary et al. |
| 7,410,357 B2 | 8/2008 | Cleary et al. |
| 7,416,408 B2 | 8/2008 | Farzin-Nia et al. |
| 7,442,041 B2 | 10/2008 | Imgrund et al. |
| 7,452,205 B2 | 11/2008 | Cinader, Jr. et al. |
| 7,458,812 B2 | 12/2008 | Sporbert et al. |
| 7,469,783 B2 | 12/2008 | Rose, Sr. |
| 7,471,821 B2 | 12/2008 | Rubbert et al. |
| 7,473,097 B2 | 1/2009 | Raby et al. |
| 7,556,496 B2 | 7/2009 | Cinader, Jr. et al. |
| 7,578,673 B2 | 8/2009 | Wen et al. |
| 7,578,674 B2 | 8/2009 | Chishti et al. |
| 7,585,172 B2 | 9/2009 | Rubbert |
| 7,590,462 B2 | 9/2009 | Rubbert |
| 7,604,181 B2 | 10/2009 | Culp et al. |
| 7,621,743 B2 | 11/2009 | Bathen |
| 7,641,473 B2 | 1/2010 | Sporbert |
| 7,674,110 B2 | 3/2010 | Oda |
| 7,677,887 B2 | 3/2010 | Nicholson |
| 7,699,606 B2 | 4/2010 | Sachdeva et al. |
| 7,704,072 B2 | 4/2010 | Damon |
| 7,717,708 B2 | 5/2010 | Sachdeva |
| 7,722,354 B1 | 5/2010 | Dumas |
| 7,726,470 B2 | 6/2010 | Cinader, Jr. et al. |
| 7,726,968 B2 | 6/2010 | Raby et al. |
| 7,751,925 B2 | 7/2010 | Rubbert |
| 7,762,815 B2 | 7/2010 | Cinader, Jr. et al. |
| 7,811,087 B2 | 10/2010 | Wiechmann |
| 7,837,464 B2 | 11/2010 | Marshall |
| 7,837,466 B2 | 11/2010 | Griffith et al. |
| 7,837,467 B2 | 11/2010 | Butscher |
| 7,845,938 B2 | 12/2010 | Kim et al. |
| 7,850,451 B2 | 12/2010 | Wiechmann |
| 7,871,267 B2 | 1/2011 | Griffith et al. |
| 7,878,806 B2 | 2/2011 | Lemchen |
| 7,909,603 B2 | 3/2011 | Oda |
| D636,084 S | 4/2011 | Troester |
| D636,085 S | 4/2011 | Troester |
| 7,950,131 B2 | 5/2011 | Hilliard |
| 7,993,133 B2 | 8/2011 | Cinader, Jr. et al. |
| 8,021,146 B2 | 9/2011 | Cinader, Jr. et al. |
| 8,029,275 B2 | 10/2011 | Kesling |
| 8,033,824 B2 | 10/2011 | Oda et al. |
| 8,038,444 B2 | 10/2011 | Kitching et al. |
| 8,047,034 B2 | 11/2011 | Butscher |
| 8,057,226 B2 | 11/2011 | Wiechmann |
| 8,070,487 B2 | 12/2011 | Chishti et al. |
| 8,082,769 B2 | 12/2011 | Butscher |
| 8,092,215 B2 | 1/2012 | Stone-collonge et al. |
| 8,102,538 B2 | 1/2012 | Babayoff |
| 8,113,828 B1 | 2/2012 | Greenfield |
| 8,113,829 B2 | 2/2012 | Sachdeva |
| 8,114,327 B2 | 2/2012 | Cinader, Jr. et al. |
| 8,121,718 B2 | 2/2012 | Rubbert |
| 8,142,187 B2 | 3/2012 | Sporbert |

(56) References Cited

U.S. PATENT DOCUMENTS

| | | |
|---|---|---|
| 8,152,519 B1 | 4/2012 | Dumas et al. |
| 8,177,551 B2 | 5/2012 | Sachdeva et al. |
| 8,192,196 B2 | 6/2012 | Singh |
| 8,192,197 B2 | 6/2012 | Sporbert |
| 8,194,067 B2 | 6/2012 | Raby |
| 8,220,195 B2 | 7/2012 | Maijer et al. |
| 8,251,699 B2 | 8/2012 | Reising et al. |
| 8,266,940 B2 | 9/2012 | Riemeir et al. |
| 8,297,970 B2 | 10/2012 | Kanomi |
| 8,308,478 B2 | 11/2012 | Primus et al. |
| 8,313,327 B1 | 11/2012 | Won |
| 8,359,115 B2 | 1/2013 | Kopelman et al. |
| 8,363,228 B2 | 1/2013 | Babayoff |
| 8,366,440 B2 | 2/2013 | Bathen |
| 8,376,739 B2 | 2/2013 | Dupray |
| 8,382,917 B2 | 2/2013 | Johnson |
| 8,393,896 B2 | 3/2013 | Oda |
| 8,417,366 B2 | 4/2013 | Getto |
| 8,439,671 B2 | 5/2013 | Cinader, Jr. |
| 8,439,672 B2 | 5/2013 | Matov et al. |
| 8,451,456 B2 | 5/2013 | Babayoff |
| 8,454,364 B2 | 6/2013 | Taub et al. |
| 8,459,988 B2 | 6/2013 | Dumas |
| 8,465,279 B2 | 6/2013 | Bathen |
| 8,469,704 B2 | 6/2013 | Oda et al. |
| 8,479,393 B2 | 7/2013 | Abels et al. |
| 8,485,816 B2 | 7/2013 | Macchi |
| 8,491,306 B2 | 7/2013 | Raby et al. |
| D688,803 S | 8/2013 | Gilbert |
| 8,500,445 B2 | 8/2013 | Borri |
| 8,517,727 B2 | 8/2013 | Raby et al. |
| 8,545,221 B2 | 10/2013 | Sonte-collenge et al. |
| 8,550,814 B1 | 10/2013 | Collins |
| 8,562,337 B2 | 10/2013 | Kuo et al. |
| 8,573,972 B2 | 11/2013 | Matov et al. |
| 8,591,225 B2 | 11/2013 | Wu et al. |
| 8,591,226 B2 | 11/2013 | Griffith et al. |
| 8,636,505 B2 | 1/2014 | Fornoff |
| 8,638,447 B2 | 1/2014 | Babayoff et al. |
| 8,638,448 B2 | 1/2014 | Babayoff et al. |
| 8,675,207 B2 | 3/2014 | Babayoff |
| 8,678,818 B2 | 3/2014 | Dupray |
| 8,690,568 B2 | 4/2014 | Chapouland |
| 8,708,697 B2 | 4/2014 | Li et al. |
| 8,714,972 B2 | 5/2014 | Eichenberg |
| 8,734,149 B2 | 5/2014 | Phan et al. |
| 8,734,690 B2 | 5/2014 | Komori |
| 8,780,106 B2 | 7/2014 | Chishti et al. |
| 8,805,048 B2 | 8/2014 | Batesole |
| 8,805,563 B2 | 8/2014 | Kopelman et al. |
| 8,807,995 B2 | 8/2014 | Kabbani et al. |
| 8,827,697 B2 | 9/2014 | Cinader, Jr. et al. |
| 8,845,330 B2 | 9/2014 | Taub et al. |
| 8,871,132 B2 | 10/2014 | Abels et al. |
| 8,931,171 B2 | 1/2015 | Rosenberg |
| 8,932,054 B1 | 1/2015 | Rosenberg |
| 8,936,464 B2 | 1/2015 | Kopelman |
| 8,961,172 B2 | 2/2015 | Dupray |
| 8,968,365 B2 | 3/2015 | Aschmann et al. |
| 8,979,528 B2 | 3/2015 | Macchi |
| 8,986,004 B2 | 3/2015 | Dumas |
| 8,992,215 B2 | 3/2015 | Chapouland |
| 8,998,608 B2 | 4/2015 | Imgrund et al. |
| 9,022,781 B2 | 5/2015 | Kuo et al. |
| D731,659 S | 6/2015 | Singh |
| 9,066,775 B2 | 6/2015 | Bukhary |
| 9,089,386 B2 | 7/2015 | Hagelganz |
| D736,945 S | 8/2015 | Singh |
| 9,101,433 B2 | 8/2015 | Babayoff |
| 9,119,689 B2 | 9/2015 | Kabbani |
| 9,127,338 B2 | 9/2015 | Johnson |
| 9,144,473 B2 | 9/2015 | Aldo |
| 9,161,823 B2 | 10/2015 | Morton et al. |
| 9,204,942 B2 | 12/2015 | Phan et al. |
| 9,299,192 B2 | 3/2016 | Kopelman |
| 9,301,815 B2 | 4/2016 | Dumas |
| 9,329,675 B2 | 5/2016 | Ojelund et al. |
| 9,339,352 B2 | 5/2016 | Cinader et al. |
| 9,387,055 B2 | 7/2016 | Cinader, Jr. et al. |
| 9,402,695 B2 | 8/2016 | Curiel et al. |
| 9,427,291 B2 | 8/2016 | Khoshnevis et al. |
| 9,427,916 B2 | 8/2016 | Taub et al. |
| 9,433,477 B2 | 9/2016 | Borovinskih et al. |
| 9,439,737 B2 | 9/2016 | Gonzales et al. |
| 9,451,873 B1 | 9/2016 | Kopelman et al. |
| 9,492,246 B2 | 11/2016 | Lin |
| 9,498,302 B1 | 11/2016 | Patel |
| D774,193 S | 12/2016 | Makmel et al. |
| 9,510,757 B2 | 12/2016 | Kopelman et al. |
| 9,517,112 B2 | 12/2016 | Hagelganz et al. |
| 9,529,970 B2 | 12/2016 | Andreiko |
| 9,532,854 B2 | 1/2017 | Cinader et al. |
| 9,539,064 B2 | 1/2017 | Abels et al. |
| 9,554,875 B2 | 1/2017 | Gualano |
| 9,566,132 B2 | 2/2017 | Stone-collonge et al. |
| 9,566,134 B2 | 2/2017 | Hagelganz et al. |
| 9,585,733 B2 | 3/2017 | Voudouris |
| 9,585,734 B2 | 3/2017 | Lai et al. |
| 9,597,165 B2 | 3/2017 | Kopelman |
| 9,610,628 B2 | 4/2017 | Riemeier |
| 9,615,901 B2 | 4/2017 | Babyoff et al. |
| 9,622,834 B2 | 4/2017 | Chapouland |
| 9,622,835 B2 | 4/2017 | See et al. |
| 9,629,551 B2 | 4/2017 | Fisker et al. |
| 9,629,694 B2 | 4/2017 | Chun et al. |
| 9,642,678 B2 | 5/2017 | Kuo |
| 9,675,435 B2 | 6/2017 | Karazivan et al. |
| 9,707,056 B2 | 7/2017 | Machata et al. |
| 9,763,750 B2 | 9/2017 | Kim et al. |
| 9,788,917 B2 | 10/2017 | Mah |
| 9,814,543 B2 | 11/2017 | Huang et al. |
| 9,844,420 B2 | 12/2017 | Cheang |
| 9,848,958 B2 | 12/2017 | Matov et al. |
| 9,867,678 B2 | 1/2018 | Macchi |
| 9,867,680 B2 | 1/2018 | Damon |
| 9,872,741 B2 | 1/2018 | Gualano |
| 9,877,804 B2 | 1/2018 | Chester |
| 9,877,805 B2 | 1/2018 | Abels et al. |
| 9,925,020 B2 | 3/2018 | Jo |
| 9,937,018 B2 | 4/2018 | Martz et al. |
| 9,937,020 B2 | 4/2018 | Choi |
| 9,956,058 B2 | 5/2018 | Kopelman |
| 9,962,244 B2 | 5/2018 | Esbech et al. |
| 9,975,294 B2 | 5/2018 | Taub et al. |
| 9,987,105 B2 | 6/2018 | Dupray |
| 10,028,804 B2 | 7/2018 | Schulhof et al. |
| 10,045,834 B2 | 8/2018 | Gualano |
| 10,052,177 B2 | 8/2018 | Andreiko |
| 10,058,400 B2 | 8/2018 | Abels et al. |
| 10,058,401 B2 | 8/2018 | Tan |
| 10,064,706 B2 | 9/2018 | Dickerson |
| 10,070,943 B2 | 9/2018 | Fornoff |
| 10,076,780 B2 | 9/2018 | Riemeier et al. |
| 10,098,709 B1 | 10/2018 | Kitching et al. |
| 10,130,987 B2 | 11/2018 | Riemeier et al. |
| 10,136,966 B2 | 11/2018 | Reybrouck et al. |
| 10,149,738 B2 | 12/2018 | Lee |
| 10,179,035 B2 | 1/2019 | Shivapuja et al. |
| 10,179,036 B2 | 1/2019 | Lee |
| 10,219,877 B2 | 3/2019 | Khoshnevis et al. |
| 10,226,312 B2 | 3/2019 | Khoshnevis et al. |
| 10,238,476 B2 | 3/2019 | Karazivan et al. |
| 10,241,499 B1 | 3/2019 | Griffin |
| 10,278,791 B2 | 5/2019 | Schumacher |
| 10,278,792 B2 | 5/2019 | Wool |
| 10,278,793 B2 | 5/2019 | Gonzalez et al. |
| 10,292,789 B2 | 5/2019 | Martz et al. |
| 10,307,221 B2 | 6/2019 | Cinader, Jr. |
| 10,314,673 B2 | 6/2019 | Schulhof et al. |
| 10,327,867 B2 | 6/2019 | Nikolskiy et al. |
| 10,342,640 B2 | 7/2019 | Cassalia |
| 10,368,961 B2 | 8/2019 | Paehl et al. |
| 10,383,707 B2 | 8/2019 | Roein Peikar et al. |
| D859,663 S | 9/2019 | Cetta et al. |

(56) References Cited

U.S. PATENT DOCUMENTS

| | | |
|---|---|---|
| 10,413,386 B2 | 9/2019 | Moon et al. |
| 10,426,575 B1 | 10/2019 | Raslambekov |
| 10,456,228 B2 | 10/2019 | Karazivan et al. |
| 10,478,271 B2 | 11/2019 | Patel |
| 10,485,638 B2 | 11/2019 | Salah |
| 10,492,889 B2 | 12/2019 | Kim et al. |
| 10,492,890 B2 | 12/2019 | Cinader, Jr. et al. |
| 10,555,792 B2 | 2/2020 | Kopelman et al. |
| 10,588,717 B2 | 3/2020 | Chun et al. |
| 10,595,966 B2 | 3/2020 | Carrier, Jr. et al. |
| 10,603,137 B2 | 3/2020 | Alauddin et al. |
| 10,636,522 B2 | 4/2020 | Katzman et al. |
| 10,639,130 B2 | 5/2020 | Blees et al. |
| 10,639,134 B2 | 5/2020 | Shangjani et al. |
| 10,717,208 B1 | 7/2020 | Raslambekov et al. |
| 10,754,325 B1 | 8/2020 | Griffin, III |
| 10,758,323 B2 | 9/2020 | Kopelman |
| 10,772,706 B2 | 9/2020 | Schumacher |
| 10,806,376 B2 | 10/2020 | Lotan et al. |
| 10,809,697 B2 | 10/2020 | Grapsas |
| 10,828,133 B2 | 11/2020 | Tong et al. |
| 10,849,723 B1 | 12/2020 | Yancey et al. |
| 10,869,738 B2 | 12/2020 | Witte et al. |
| 10,881,488 B2 | 1/2021 | Kopelman |
| 10,881,489 B2 | 1/2021 | Tong et al. |
| 10,905,527 B2 | 2/2021 | Roein Peikar et al. |
| 10,932,887 B2 | 3/2021 | Hung |
| 10,935,958 B2 | 3/2021 | Sirovskiy et al. |
| 10,952,820 B2 | 3/2021 | Song et al. |
| 10,980,614 B2 | 4/2021 | Roein Peikar et al. |
| 10,984,549 B2 | 4/2021 | Goncharov et al. |
| 10,993,782 B1 | 5/2021 | Raslambekov |
| 10,993,785 B2 | 5/2021 | Roein Peikar et al. |
| 10,996,813 B2 | 5/2021 | Makarenkova et al. |
| 11,020,205 B2 | 6/2021 | Li et al. |
| 11,045,281 B2 | 6/2021 | Tsai et al. |
| 11,045,295 B2 | 6/2021 | Karazivan et al. |
| 11,058,517 B2 | 7/2021 | Tong et al. |
| 11,058,518 B2 | 7/2021 | Roein Peikar et al. |
| 11,058,520 B2 | 7/2021 | Khoshnevis et al. |
| 11,072,021 B2 | 7/2021 | Riemeier et al. |
| 11,083,411 B2 | 8/2021 | Yancey et al. |
| 11,083,546 B2 | 8/2021 | Cassalia |
| 11,103,330 B2 | 8/2021 | Webber et al. |
| 11,129,696 B2 | 9/2021 | Khoshnevis et al. |
| 11,147,652 B2 | 10/2021 | Mason et al. |
| 11,154,382 B2 | 10/2021 | Kopelman et al. |
| 11,229,505 B2 | 1/2022 | Schumacher et al. |
| 11,234,794 B2 | 2/2022 | Pokotilov et al. |
| 11,304,781 B2 | 4/2022 | Chun et al. |
| 11,317,994 B2 | 5/2022 | Peikar et al. |
| 11,317,995 B2 | 5/2022 | Peikar et al. |
| 11,324,572 B2 | 5/2022 | Peikar et al. |
| 11,331,165 B2 | 5/2022 | Owen |
| 11,337,486 B2 | 5/2022 | Oda et al. |
| 11,357,598 B2 | 6/2022 | Cramer |
| 11,382,720 B2 | 7/2022 | Kopelman et al. |
| 11,413,117 B2 | 8/2022 | Griffin, III et al. |
| 11,419,701 B2 | 8/2022 | Shanjani et al. |
| 11,433,658 B2 | 9/2022 | Friedrich et al. |
| 11,435,142 B2 | 9/2022 | Hauptmann |
| 11,446,117 B2 | 9/2022 | Paehl et al. |
| 11,446,219 B2 | 9/2022 | Kohler et al. |
| 11,464,604 B2 | 10/2022 | Makarenkova et al. |
| 11,471,254 B2 | 10/2022 | Owen |
| 11,471,255 B2 | 10/2022 | Cinader, Jr. et al. |
| 11,478,335 B2 | 10/2022 | Lai et al. |
| 11,478,337 B2 | 10/2022 | Griffin, III et al. |
| 11,490,995 B2 | 11/2022 | Wratten, Jr. et al. |
| 11,500,354 B2 | 11/2022 | Griffin, III et al. |
| 11,504,212 B2 | 11/2022 | Wratten, Jr. et al. |
| 11,510,757 B2 | 11/2022 | Khoshnevis et al. |
| 11,510,758 B2 | 11/2022 | Khoshnevis et al. |
| D972,732 S | 12/2022 | Villanueva |
| 11,517,405 B2 | 12/2022 | Khoshnevis et al. |
| 11,612,458 B1 | 3/2023 | Tong et al. |
| 11,612,459 B2 | 3/2023 | Tong et al. |
| 11,696,816 B2 | 7/2023 | Gardner |
| 2001/0055741 A1 | 12/2001 | Dixon et al. |
| 2002/0006597 A1 | 1/2002 | Andreiko et al. |
| 2002/0010568 A1 | 1/2002 | Rubbert et al. |
| 2002/0081546 A1 | 6/2002 | Tricca et al. |
| 2002/0098460 A1 | 7/2002 | Farzin-Nia |
| 2002/0192617 A1 | 12/2002 | Phan et al. |
| 2003/0049582 A1 | 3/2003 | Abels et al. |
| 2003/0070468 A1 | 4/2003 | Butscher et al. |
| 2003/0180689 A1 | 9/2003 | Arx et al. |
| 2003/0194677 A1 | 10/2003 | Sachdeva et al. |
| 2003/0207224 A1 | 11/2003 | Lotte |
| 2004/0048222 A1 | 3/2004 | Forster et al. |
| 2004/0072120 A1 | 4/2004 | Lauren |
| 2004/0083611 A1 | 5/2004 | Rubbert et al. |
| 2004/0166459 A1 | 8/2004 | Voudouris |
| 2004/0168752 A1 | 9/2004 | Julien |
| 2004/0199177 A1 | 10/2004 | Kim |
| 2004/0219471 A1 | 11/2004 | Cleary et al. |
| 2005/0043837 A1 | 2/2005 | Rubbert et al. |
| 2005/0074716 A1 | 4/2005 | Cleary et al. |
| 2005/0106529 A1 | 5/2005 | Abolfathi et al. |
| 2005/0181332 A1 | 8/2005 | Sernetz |
| 2005/0191592 A1 | 9/2005 | Farzin-Nia et al. |
| 2005/0233276 A1 | 10/2005 | Kopelman et al. |
| 2005/0244780 A1 | 11/2005 | Abels et al. |
| 2005/0244781 A1 | 11/2005 | Abels et al. |
| 2005/0244790 A1 | 11/2005 | Kuperman |
| 2006/0006092 A1 | 1/2006 | DuBos |
| 2006/0014116 A1 | 1/2006 | Maijer et al. |
| 2006/0068354 A1 | 3/2006 | Jeckel |
| 2006/0127834 A1 | 6/2006 | Szwajkowski et al. |
| 2006/0175209 A1 | 8/2006 | Sabilla et al. |
| 2006/0223021 A1 | 10/2006 | Cinader et al. |
| 2006/0223031 A1 | 10/2006 | Cinader, Jr. et al. |
| 2006/0257813 A1 | 11/2006 | Highland |
| 2006/0257821 A1 | 11/2006 | Cinader, Jr. et al. |
| 2007/0015103 A1 | 1/2007 | Sore |
| 2007/0031773 A1 | 2/2007 | Scuzzo |
| 2007/0031775 A1 | 2/2007 | Andreiko |
| 2007/0087302 A1 | 4/2007 | Reising et al. |
| 2007/0107745 A1 | 5/2007 | Kiyomoto |
| 2007/0111154 A1 | 5/2007 | Sampermans |
| 2007/0118215 A1 | 5/2007 | Moaddeb |
| 2007/0134611 A1 | 6/2007 | Nicholson |
| 2007/0134612 A1 | 6/2007 | Contencin |
| 2007/0141525 A1 | 6/2007 | Cinader, Jr. |
| 2007/0154859 A1 | 7/2007 | Hilliard |
| 2007/0172788 A1 | 7/2007 | Hill, II et al. |
| 2007/0190478 A1 | 8/2007 | Goldberg et al. |
| 2007/0231768 A1 | 10/2007 | Hutchinson |
| 2007/0235051 A1 | 10/2007 | Robinson |
| 2007/0287121 A1 | 12/2007 | Cinader et al. |
| 2008/0032250 A1 | 2/2008 | Kopelman et al. |
| 2008/0057460 A1 | 3/2008 | Hicks |
| 2008/0063995 A1 | 3/2008 | Farzin-Nia et al. |
| 2008/0131831 A1 | 6/2008 | Abels et al. |
| 2008/0160475 A1 | 7/2008 | Rojas-Pardini |
| 2008/0199825 A1 | 8/2008 | Jahn |
| 2008/0227049 A1 | 9/2008 | Sevinc |
| 2008/0233528 A1 | 9/2008 | Kim et al. |
| 2008/0233530 A1 | 9/2008 | Cinader |
| 2008/0233531 A1 | 9/2008 | Raby et al. |
| 2008/0248439 A1 | 10/2008 | Griffith et al. |
| 2008/0254403 A1 | 10/2008 | Hilliard |
| 2008/0286711 A1 | 11/2008 | Corcoran et al. |
| 2008/0305450 A1 | 12/2008 | Steen |
| 2009/0004619 A1 | 1/2009 | Oda et al. |
| 2009/0019698 A1 | 1/2009 | Christoff |
| 2009/0042160 A1 | 2/2009 | Ofir |
| 2009/0088838 A1 | 4/2009 | Shaolian et al. |
| 2009/0191502 A1 | 7/2009 | Cao et al. |
| 2009/0197217 A1 | 8/2009 | Butscher et al. |
| 2009/0216322 A1 | 8/2009 | Le et al. |
| 2009/0220907 A1 | 9/2009 | Suyama |
| 2009/0220920 A1 | 9/2009 | Primus et al. |
| 2009/0222075 A1 | 9/2009 | Gordon |

(56) References Cited

U.S. PATENT DOCUMENTS

| | | |
|---|---|---|
| 2010/0092903 A1 | 4/2010 | Sabilla |
| 2010/0092905 A1 | 4/2010 | Martin |
| 2010/0105000 A1 | 4/2010 | Scommegna et al. |
| 2010/0129765 A1 | 5/2010 | Mohr et al. |
| 2010/0129766 A1 | 5/2010 | Hilgers |
| 2010/0178628 A1 | 7/2010 | Kim |
| 2010/0179789 A1 | 7/2010 | Sachdeva et al. |
| 2010/0193979 A1 | 8/2010 | Goldberg et al. |
| 2010/0241120 A1 | 9/2010 | Bledsoe et al. |
| 2010/0279243 A1 | 11/2010 | Cinader, Jr. et al. |
| 2010/0304321 A1 | 12/2010 | Patel |
| 2011/0008745 A1 | 1/2011 | McQuillan et al. |
| 2011/0027743 A1 | 2/2011 | Cinader, Jr. et al. |
| 2011/0059414 A1 | 3/2011 | Hirsch |
| 2011/0091832 A1 | 4/2011 | Kim et al. |
| 2011/0220612 A1 | 9/2011 | Kim |
| 2011/0250556 A1 | 10/2011 | Heiser |
| 2011/0270583 A1 | 11/2011 | Getto et al. |
| 2011/0287376 A1 | 11/2011 | Walther |
| 2011/0314891 A1 | 12/2011 | Gilbert |
| 2012/0048432 A1 | 3/2012 | Johnson et al. |
| 2012/0148972 A1 | 6/2012 | Lewis |
| 2012/0208144 A1 | 8/2012 | Chiaramonte |
| 2012/0266419 A1 | 10/2012 | Browne et al. |
| 2012/0315595 A1 | 12/2012 | Beaudoin |
| 2012/0322019 A1 | 12/2012 | Lewis |
| 2013/0065193 A1 | 3/2013 | Curiel et al. |
| 2013/0122443 A1 | 5/2013 | Huang et al. |
| 2013/0177862 A1 | 7/2013 | Johnson |
| 2013/0196281 A1 | 8/2013 | Thornton |
| 2013/0196282 A1 | 8/2013 | Eichelberger et al. |
| 2013/0260329 A1 | 10/2013 | Voudouris |
| 2013/0315595 A1 | 11/2013 | Barr |
| 2014/0154637 A1 | 6/2014 | Hansen et al. |
| 2014/0170586 A1 | 6/2014 | Cantarella |
| 2014/0234794 A1 | 8/2014 | Vu |
| 2014/0255864 A1 | 9/2014 | Machata et al. |
| 2014/0287376 A1 | 9/2014 | Hultgren et al. |
| 2014/0363782 A1 | 12/2014 | Wiechmann et al. |
| 2015/0010879 A1 | 1/2015 | Kurthy |
| 2015/0064641 A1* | 3/2015 | Gardner ............... A61C 9/004 700/98 |
| 2015/0072299 A1 | 3/2015 | Alauddin et al. |
| 2015/0140501 A1 | 5/2015 | Kim |
| 2015/0201943 A1 | 7/2015 | Brooks et al. |
| 2015/0265376 A1 | 9/2015 | Kopelman |
| 2015/0305833 A1 | 10/2015 | Cosse |
| 2015/0313687 A1 | 11/2015 | Blees et al. |
| 2015/0351872 A1 | 12/2015 | Jo |
| 2015/0359610 A1 | 12/2015 | Gonzalez et al. |
| 2015/0366638 A1 | 12/2015 | Kopelman et al. |
| 2016/0074139 A1 | 3/2016 | Machata et al. |
| 2016/0095670 A1 | 4/2016 | Witte et al. |
| 2016/0106522 A1 | 4/2016 | Kim |
| 2016/0135926 A1 | 5/2016 | Djamchidi |
| 2016/0166357 A1 | 6/2016 | Portalupi |
| 2016/0175073 A1 | 6/2016 | Huang |
| 2016/0206403 A1 | 7/2016 | Ouellette et al. |
| 2016/0228214 A1 | 8/2016 | Sachdeva et al. |
| 2016/0242871 A1 | 8/2016 | Morton et al. |
| 2016/0270885 A1 | 9/2016 | Kwon et al. |
| 2016/0278883 A1 | 9/2016 | Fasci et al. |
| 2016/0287354 A1 | 10/2016 | Viecilli et al. |
| 2016/0310239 A1 | 10/2016 | Paehl et al. |
| 2016/0374780 A1 | 12/2016 | Carrillo Gonzalez et al. |
| 2017/0086948 A1 | 3/2017 | Von Mandach |
| 2017/0105816 A1 | 4/2017 | Ward |
| 2017/0105817 A1 | 4/2017 | Chun et al. |
| 2017/0128169 A1 | 5/2017 | Lai et al. |
| 2017/0135793 A1 | 5/2017 | Webber et al. |
| 2017/0140381 A1 | 5/2017 | Ducrohet et al. |
| 2017/0151037 A1 | 6/2017 | Lee |
| 2017/0156823 A1 | 6/2017 | Roein Peikar et al. |
| 2017/0165032 A1 | 6/2017 | Webber et al. |
| 2017/0165532 A1 | 6/2017 | Khan et al. |
| 2017/0181813 A1 | 6/2017 | Kalkhoran |
| 2017/0196660 A1 | 7/2017 | Lee |
| 2017/0224444 A1 | 8/2017 | Viecilli et al. |
| 2017/0231721 A1 | 8/2017 | Akeel et al. |
| 2017/0246682 A1 | 8/2017 | Duerig |
| 2017/0252140 A1 | 9/2017 | Murphy et al. |
| 2017/0281313 A1 | 10/2017 | Kim |
| 2017/0281314 A1 | 10/2017 | Freimuller |
| 2017/0296253 A1 | 10/2017 | Brandner et al. |
| 2017/0296304 A1 | 10/2017 | Tong et al. |
| 2017/0312052 A1 | 11/2017 | Moss et al. |
| 2017/0318881 A1 | 11/2017 | Fonte et al. |
| 2017/0325911 A1 | 11/2017 | Marshall |
| 2017/0340777 A1 | 11/2017 | Ma et al. |
| 2018/0014915 A1 | 1/2018 | Voudouris |
| 2018/0014916 A1 | 1/2018 | Cinader, Jr. et al. |
| 2018/0021108 A1 | 1/2018 | Cinader, Jr. et al. |
| 2018/0049847 A1 | 2/2018 | Oda et al. |
| 2018/0055605 A1 | 3/2018 | Witte et al. |
| 2018/0071057 A1 | 3/2018 | Rudman |
| 2018/0110589 A1 | 4/2018 | Gao |
| 2018/0132974 A1 | 5/2018 | Rudman |
| 2018/0153651 A1* | 6/2018 | Tong ............... B29C 64/393 |
| 2018/0161121 A1 | 6/2018 | Butler et al. |
| 2018/0161126 A1 | 6/2018 | Marshall et al. |
| 2018/0168788 A1 | 6/2018 | Fernie |
| 2018/0185120 A1 | 7/2018 | Wool |
| 2018/0185121 A1 | 7/2018 | Pitts et al. |
| 2018/0206941 A1 | 7/2018 | Lee |
| 2018/0214250 A1 | 8/2018 | Martz |
| 2018/0235437 A1 | 8/2018 | Ozerov et al. |
| 2018/0243052 A1 | 8/2018 | Lee |
| 2018/0303583 A1* | 10/2018 | Tong ............... A61C 9/004 |
| 2018/0338564 A1 | 11/2018 | Oda et al. |
| 2019/0001396 A1 | 1/2019 | Riemeier et al. |
| 2019/0019187 A1 | 1/2019 | Miller et al. |
| 2019/0053876 A1 | 2/2019 | Sterental et al. |
| 2019/0090988 A1 | 3/2019 | Schumacher et al. |
| 2019/0090989 A1 | 3/2019 | Jo |
| 2019/0125494 A1 | 5/2019 | Li et al. |
| 2019/0142551 A1 | 5/2019 | Dickenson et al. |
| 2019/0159871 A1 | 5/2019 | Chan et al. |
| 2019/0163060 A1 | 5/2019 | Skamser et al. |
| 2019/0175304 A1 | 6/2019 | Morton et al. |
| 2019/0231488 A1 | 8/2019 | Dickerson |
| 2019/0247147 A1 | 8/2019 | Grande et al. |
| 2019/0252065 A1 | 8/2019 | Katzman et al. |
| 2019/0262103 A1 | 8/2019 | Cassalia |
| 2019/0276921 A1 | 9/2019 | Duerig et al. |
| 2019/0321136 A1 | 10/2019 | Martz et al. |
| 2019/0321138 A1 | 10/2019 | Roein Peikar et al. |
| 2019/0328487 A1 | 10/2019 | Levin et al. |
| 2019/0328491 A1 | 10/2019 | Hostettler et al. |
| 2019/0343606 A1 | 11/2019 | Wu et al. |
| 2019/0350682 A1 | 11/2019 | Cinader, Jr. et al. |
| 2019/0365507 A1 | 12/2019 | Khoshnevis et al. |
| 2019/0388189 A1 | 12/2019 | Shivapuja et al. |
| 2020/0000551 A1 | 1/2020 | Li et al. |
| 2020/0066391 A1 | 2/2020 | Sachdeva et al. |
| 2020/0078137 A1* | 3/2020 | Chen ............... A61C 7/08 |
| 2020/0107911 A1 | 4/2020 | Roein Peikar et al. |
| 2020/0129272 A1 | 4/2020 | Roein Peikar et al. |
| 2020/0138549 A1 | 5/2020 | Chun et al. |
| 2020/0146779 A1 | 5/2020 | Zhang |
| 2020/0146791 A1 | 5/2020 | Schülke et al. |
| 2020/0170757 A1 | 6/2020 | Kopelman et al. |
| 2020/0188063 A1 | 6/2020 | Cinader, Jr. et al. |
| 2020/0197131 A1 | 6/2020 | Matov et al. |
| 2020/0214806 A1 | 7/2020 | Hung |
| 2020/0229903 A1 | 7/2020 | Sandwick |
| 2020/0275996 A1 | 9/2020 | Tong et al. |
| 2020/0281611 A1 | 9/2020 | Kelly et al. |
| 2020/0338706 A1 | 10/2020 | Cunningham et al. |
| 2020/0345455 A1 | 11/2020 | Roein Peikar et al. |
| 2020/0345459 A1 | 11/2020 | Schueller et al. |
| 2020/0345460 A1 | 11/2020 | Roein Peikar et al. |
| 2020/0352765 A1 | 11/2020 | Lin |
| 2020/0360109 A1 | 11/2020 | Gao et al. |
| 2020/0375270 A1 | 12/2020 | Holschuh et al. |

(56) References Cited

U.S. PATENT DOCUMENTS

| | | |
|---|---|---|
| 2020/0375699 A1 | 12/2020 | Roein Peikar et al. |
| 2020/0390524 A1 | 12/2020 | Roein Peikar et al. |
| 2020/0390535 A1 | 12/2020 | Curtis et al. |
| 2020/0405191 A1 | 12/2020 | Lotan et al. |
| 2020/0405452 A1 | 12/2020 | Song et al. |
| 2021/0007830 A1 | 1/2021 | Roein Peikar et al. |
| 2021/0007832 A1 | 1/2021 | Roein Peikar et al. |
| 2021/0045701 A1 | 2/2021 | Unklesbay et al. |
| 2021/0068928 A1 | 3/2021 | Witte et al. |
| 2021/0077227 A1 | 3/2021 | Griffin, III et al. |
| 2021/0093422 A1 | 4/2021 | Tong et al. |
| 2021/0134450 A1 | 5/2021 | Katzman et al. |
| 2021/0137644 A1 | 5/2021 | Benarouch et al. |
| 2021/0145547 A1 | 5/2021 | Roein Peikar et al. |
| 2021/0177551 A1 | 6/2021 | Roein Peikar et al. |
| 2021/0186662 A1 | 6/2021 | Roein Peikar et al. |
| 2021/0205049 A1 | 7/2021 | Cinader, Jr. |
| 2021/0212803 A1 | 7/2021 | Tong et al. |
| 2021/0244502 A1 | 8/2021 | Farkash et al. |
| 2021/0244505 A1 | 8/2021 | Tong et al. |
| 2021/0244507 A1 | 8/2021 | Curiel et al. |
| 2021/0251730 A1 | 8/2021 | Curiel et al. |
| 2021/0259808 A1 | 8/2021 | Ben-gal Nguyen et al. |
| 2021/0275286 A1 | 9/2021 | Karazivan et al. |
| 2021/0330430 A1 | 10/2021 | Khoshnevis et al. |
| 2021/0338380 A1 | 11/2021 | Park et al. |
| 2021/0346127 A1 | 11/2021 | Cassalia |
| 2021/0353389 A1 | 11/2021 | Peikar et al. |
| 2021/0369413 A1 | 12/2021 | Li et al. |
| 2021/0378792 A1 | 12/2021 | Akopov et al. |
| 2021/0386523 A1 | 12/2021 | Raby, II et al. |
| 2021/0393375 A1 | 12/2021 | Chekh et al. |
| 2021/0401546 A1 | 12/2021 | Gardner |
| 2021/0401548 A1 | 12/2021 | Oda et al. |
| 2022/0008169 A1 | 1/2022 | Reisman |
| 2022/0023009 A1 | 1/2022 | Tong et al. |
| 2022/0031428 A1 | 2/2022 | Khoshnevis et al. |
| 2022/0039921 A1 | 2/2022 | Kopelman et al. |
| 2022/0039922 A1 | 2/2022 | Yamaguchi |
| 2022/0061964 A1 | 3/2022 | Khoshnevis et al. |
| 2022/0087783 A1 | 3/2022 | Khoshnevis et al. |
| 2022/0133438 A1 | 5/2022 | Wratten, Jr. et al. |
| 2022/0137592 A1 | 5/2022 | Cramer et al. |
| 2022/0168072 A1 | 6/2022 | Tong et al. |
| 2022/0183797 A1 | 6/2022 | Khoshnevis et al. |
| 2022/0226076 A1 | 7/2022 | Roein Peikar et al. |
| 2022/0226077 A1 | 7/2022 | Roein Peikar et al. |
| 2022/0249201 A1 | 8/2022 | Shuman et al. |
| 2022/0257341 A1 | 8/2022 | Somasundaram et al. |
| 2022/0257344 A1 | 8/2022 | Tsai et al. |
| 2022/0287804 A1 | 9/2022 | Oda |
| 2022/0304773 A1 | 9/2022 | Wratten, Jr. et al. |
| 2022/0304774 A1 | 9/2022 | Wratten, Jr. et al. |
| 2022/0314508 A1 | 10/2022 | Subramaniam et al. |
| 2022/0323183 A1 | 10/2022 | Dufour et al. |
| 2022/0338960 A1 | 10/2022 | Reising |
| 2022/0346912 A1 | 11/2022 | Li et al. |
| 2022/0361996 A1 | 11/2022 | Raby et al. |
| 2023/0070165 A1 | 3/2023 | Tong et al. |
| 2023/0070837 A1 | 3/2023 | Oda |
| 2023/0072074 A1 | 3/2023 | Oda |
| 2023/0100466 A1 | 3/2023 | Huynh et al. |

FOREIGN PATENT DOCUMENTS

| | | |
|---|---|---|
| CN | 201320224 Y | 10/2009 |
| CN | 102215773 | 10/2011 |
| CN | 202365955 | 8/2012 |
| CN | 202892116 | 4/2013 |
| CN | 203074896 | 7/2013 |
| CN | 103505293 | 1/2014 |
| CN | 203506900 | 4/2014 |
| CN | 104188728 | 12/2014 |
| CN | 204049881 | 12/2014 |
| CN | 205126459 | 4/2016 |
| CN | 105596098 | 5/2016 |
| CN | 105662615 | 6/2016 |
| CN | 205569100 | 9/2016 |
| CN | 106029002 | 10/2016 |
| CN | 106137419 | 11/2016 |
| CN | 108690967 | 10/2018 |
| CN | 109009504 | 12/2018 |
| DE | 3915807 | 11/1990 |
| DE | 20 2018 003 574 U1 | 8/2018 |
| DE | 10 2018 005 769 A1 | 1/2020 |
| DE | 10 2018 133 705 A1 | 7/2020 |
| DE | 10 2015 017 301 B3 | 3/2022 |
| EP | 0 778 008 | 6/1997 |
| EP | 1 139 902 | 10/2001 |
| EP | 1 276 433 | 1/2003 |
| EP | 1 379 193 B1 | 2/2007 |
| EP | 2 076 207 | 7/2009 |
| EP | 1 073 378 B1 | 1/2012 |
| EP | 2 522 298 | 11/2012 |
| EP | 2 617 383 | 7/2013 |
| EP | 3 285 678 | 5/2021 |
| EP | 3 954 320 | 2/2022 |
| EP | 2 726 049 | 8/2022 |
| EP | 3 019 141 | 8/2022 |
| EP | 4 034 077 | 8/2022 |
| EP | 4 035 649 | 8/2022 |
| EP | 4 044 959 | 8/2022 |
| EP | 4 048 196 | 8/2022 |
| EP | 4065647 A1 | 8/2022 |
| EP | 3 691 559 | 9/2022 |
| EP | 3 823 813 | 9/2022 |
| EP | 3 905 986 | 9/2022 |
| EP | 4 056 144 | 9/2022 |
| ES | 2315046 | 4/2010 |
| FR | 2 525 469 | 10/1983 |
| FR | 3 056 393 B1 | 10/2018 |
| JP | 11221235 A | 8/1999 |
| JP | 2009205330 A | 9/2009 |
| KR | 100549294 | 2/2006 |
| KR | 100737442 | 7/2007 |
| KR | 100925286 | 11/2009 |
| KR | 101301886 | 8/2013 |
| KR | 101583547 | 1/2016 |
| KR | 101584737 | 1/2016 |
| KR | 101723674 | 4/2017 |
| RU | 133408 U1 | 10/2013 |
| WO | WO 01/80761 | 11/2001 |
| WO | WO 01/85047 | 11/2001 |
| WO | WO 2003/045266 | 6/2003 |
| WO | WO 2005/008441 | 1/2005 |
| WO | WO 2005/094716 | 10/2005 |
| WO | WO 2007/069286 | 6/2007 |
| WO | WO 2008/051774 | 5/2008 |
| WO | WO 2011/034522 | 3/2011 |
| WO | WO 2011/090502 | 7/2011 |
| WO | WO 2011/103669 | 9/2011 |
| WO | WO 2012/089735 | 7/2012 |
| WO | WO 2012/140021 | 10/2012 |
| WO | WO 2013/019398 | 2/2013 |
| WO | WO 2014/070920 | 5/2014 |
| WO | WO 2016/148961 | 9/2016 |
| WO | WO 2016/149008 | 9/2016 |
| WO | WO 2016/199972 | 12/2016 |
| WO | WO 2016/210402 | 12/2016 |
| WO | WO 2017/007079 | 1/2017 |
| WO | WO 2017/112004 | 6/2017 |
| WO | WO 2017/172537 | 10/2017 |
| WO | WO 2017/184632 | 10/2017 |
| WO | WO 2017/194478 | 11/2017 |
| WO | WO 2017/198640 | 11/2017 |
| WO | WO 2018/102588 | 6/2018 |
| WO | WO 2018/122862 | 7/2018 |
| WO | WO 2018/144634 | 8/2018 |
| WO | WO 2018/195356 | 10/2018 |
| WO | WO 2019/135504 | 7/2019 |
| WO | WO 2020/095182 | 5/2020 |
| WO | WO 2020/178353 | 9/2020 |
| WO | WO 2020/180740 | 9/2020 |
| WO | WO 2020/223744 | 11/2020 |

(56) References Cited

FOREIGN PATENT DOCUMENTS

| | | |
|---|---|---|
| WO | WO 2020/223745 | 11/2020 |
| WO | WO 2021/087158 | 5/2021 |
| WO | WO 2021/105878 | 6/2021 |
| WO | WO 2021/214613 | 10/2021 |
| WO | WO 2021/225916 A2 | 11/2021 |
| WO | WO 2021/226618 | 11/2021 |
| WO | WO 2021/225916 A3 | 12/2021 |
| WO | WO 2021/245484 | 12/2021 |
| WO | WO 2021/252675 | 12/2021 |
| WO | WO 2022/099263 | 5/2022 |
| WO | WO 2022/099267 | 5/2022 |
| WO | WO 2022/123402 | 6/2022 |
| WO | WO 2022/137109 | 6/2022 |
| WO | WO 2022/145602 | 7/2022 |
| WO | WO 2022/159738 | 7/2022 |
| WO | WO 2022/162488 | 8/2022 |
| WO | WO 2022/162528 | 8/2022 |
| WO | WO 2022/162614 | 8/2022 |
| WO | WO 2022/167899 | 8/2022 |
| WO | WO 2022/167995 | 8/2022 |
| WO | WO 2022/180466 | 9/2022 |
| WO | WO 2022/189906 | 9/2022 |
| WO | WO 2022/192409 | 9/2022 |
| WO | WO 2022/195391 | 9/2022 |
| WO | WO 2022/204711 | 9/2022 |
| WO | WO 2022/214895 | 10/2022 |
| WO | WO 2022/217269 | 10/2022 |
| WO | WO 2022/219459 | 10/2022 |
| WO | WO 2022/229734 | 11/2022 |
| WO | WO 2022/229739 | 11/2022 |
| WO | WO 2022/236287 | 11/2022 |
| WO | WO 2023/033869 | 3/2023 |
| WO | WO 2023/033870 | 3/2023 |
| WO | WO 2023/034876 | 3/2023 |

OTHER PUBLICATIONS

ElSheikh, Moaaz Mohamed, et al. "A Forsus Distalizer: A Pilot Typodont Study". Jul.-Dec. 2004, KDJ, vol. 7, No. 2, pp. 107-115.
Gilbert, Alfredo. An in-office wire-bending robot for lingual orthodontics. ResearchGate. Article in Journal of clinical orthodontics: JCO, Apr. 2011.
Glauser-Williams Orthodontics: Appliances, http://www.glauserwilliamsorthodontics.com/treatments/orthodontic-appliances.php , accessed Nov. 30, 2015 in 4 pages.
Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.
Jiang et al. A Review on Robot in Prosthodontics and Orthodontics. Hindawi Publishing Corporation. Advances in Mechanical Engineering. Article ID 198748. 2014. 11 pages.
Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).
Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.
SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).
Xia, et al. Development of a Robotic System for Orthodontic Archwire Bending. 2016 IEEE International Conference on Robotics and Automation (ICRA). Stockholm, Sweden, May 16-21, 2016. pp. 730-735.
Yang, Won-Sik, et al. "A Study of the Regional Load Deflection Rate of Multiloop Edgewise Arch Wire." Angle Orthodontist, 2001, vol. 7, No. 2, pp. 103-109.
International Search Report for International Application No. PCT/US2020/058034 dated Feb. 9, 2021.
IPhone 3D scanning to dental software, screen shots at 0:09 and 7:00 of YouTube video, https://www.youtube.com/watch?v=QONGdQ3QiFE, uploaded Oct. 1, 2018 in 2 pages.
Invisalign® SmileView™, How Would You Look with Straight Teeth?, https://www.invisalign.com/get-started/invisalign-smileview?v=0#start, printed Jun. 7, 2022 in 2 pages.
A ScanBox demo, https://www.youtube.com/watch?v=MsCfv2PDQ0o, screen shots at 0:08 and 0:19 of YouTube video, uploaded May 5, 2019 in 2 pages.
Southern Maine Orthodontics, Virtual Orthodontic Treatment, https://southernmainebraces.com/virtual-orthodontic-treatment/, printed Jun. 7, 2022 in 3 pages.
Sinodentalgroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, dated as downloaded Jun. 7, 2023 in 12 pages.
Spini et al., "Transition temperature range of thermally activated nickel-titanium archwires", J Appl Oral Sci., dated Apr. 2014, vol. 22, No. 2, pp. 109-117.
In Brace, Brush & Floss Easily with in Brace, dated as uploaded on: May 26, 2022, YouTube, Retrieved From Internet: https://www.youtube.com/watch?v=uAsxiBlbY4Y (Dated Year: 2022).
MEAW School, Introduction to MEAW (Multi-loop Edgewise Arch Wire), dated as uploaded On: Mar. 24, 2021, YouTube, Retrieved from Internet: https://www.youtube.com/watch?v=ne785jlzN Pg (Year: 2021).
Richard Gawel, Swift Health Systems Raises $45 Million to Finance Invisible Orthodontics, dated as published on: Dec. 4, 2019, dentistrytoday.com, Retrieved from Internet: https://www.dentistrytoday.com/products/swift-health-systems-raises-45-million-to-finance-invisible-orthodontics/ (Dated Year: 2019).
In Brace, What Is In Brace?—Integration Booster, dated as uploaded on: May 22, 2023, YouTube, Retrieved from Internet: https://www.youtube.com/watch?v=ANUPkCSfQo4 (Dated Year: 2023).

\* cited by examiner

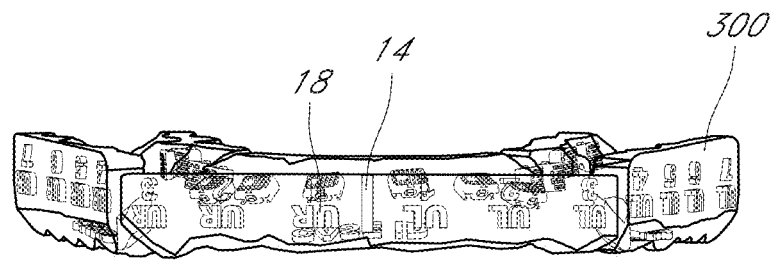
FIG. 6A
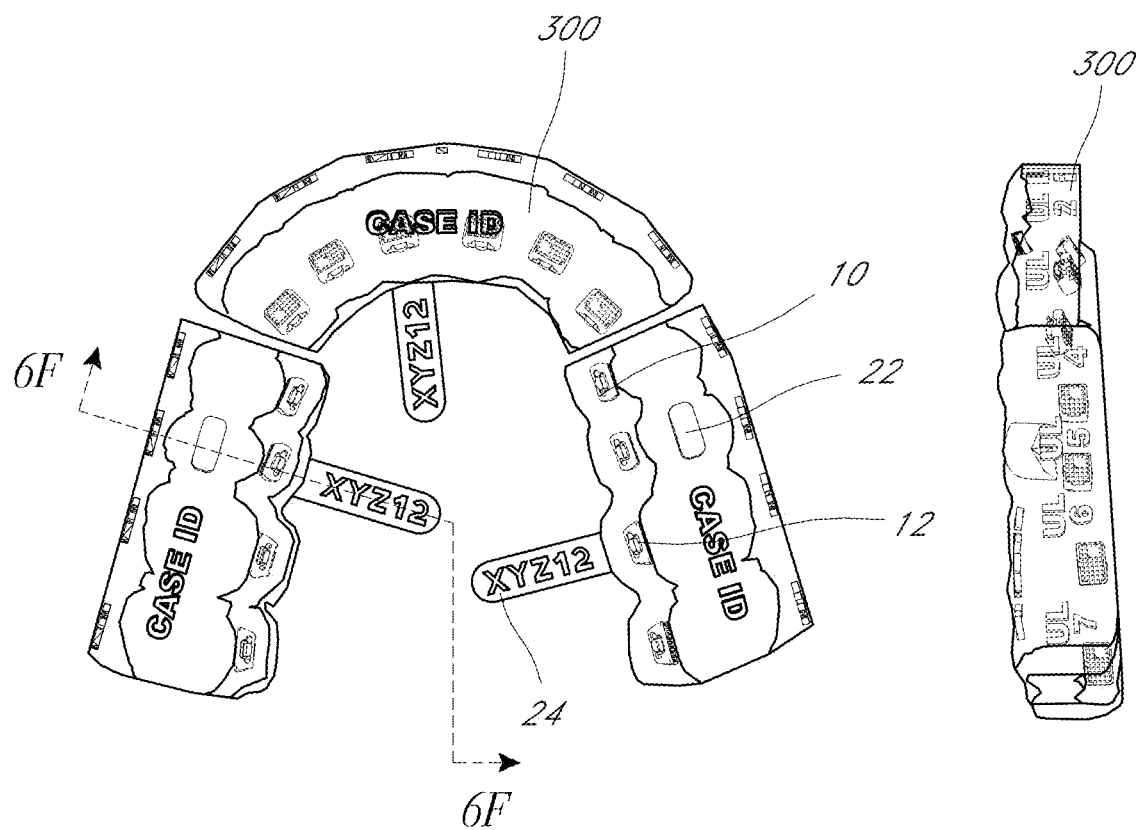
FIG. 6B
FIG. 6C

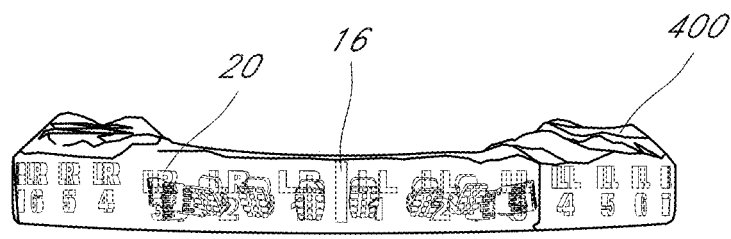
FIG. 7A
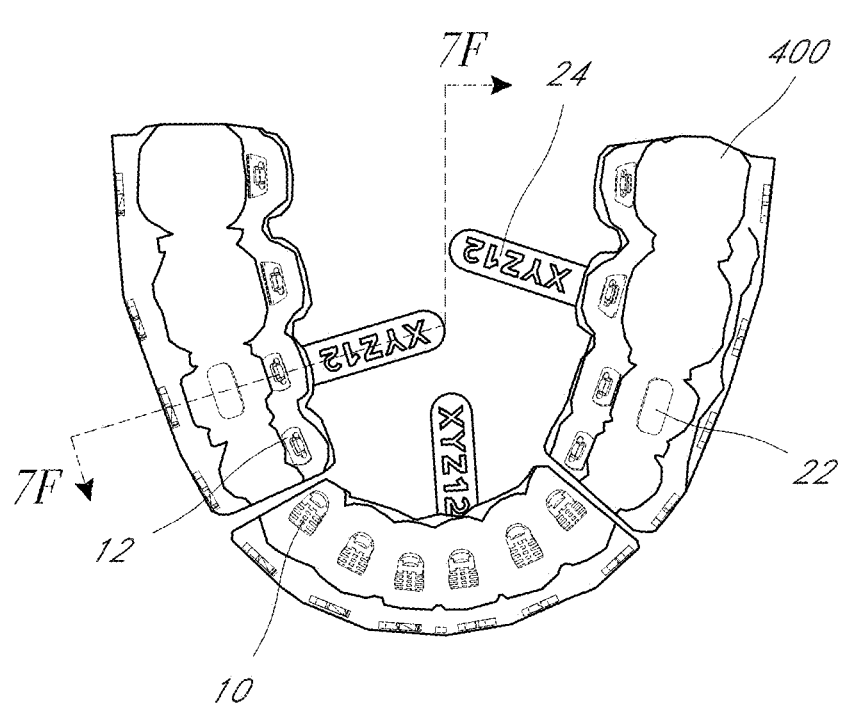 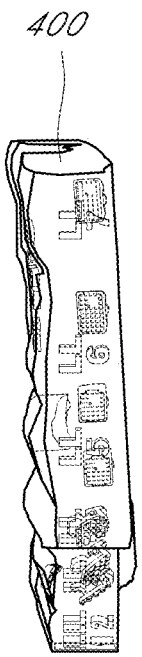
FIG. 7B    FIG. 7C

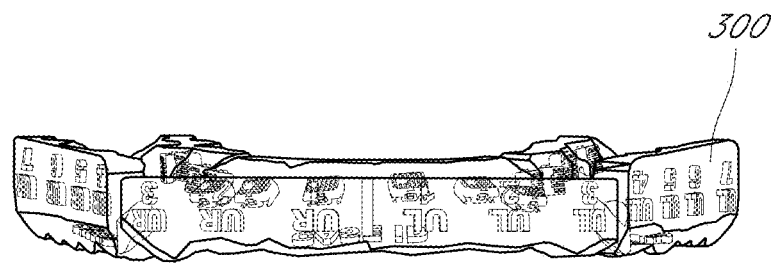
FIG. 9A
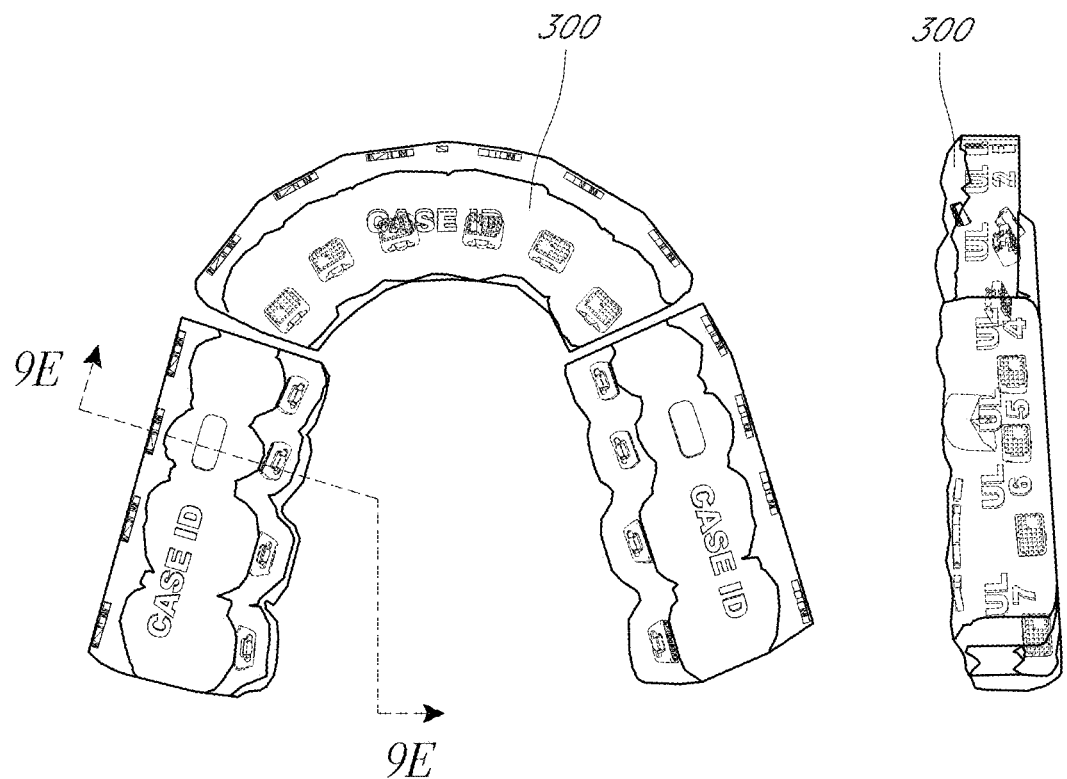
FIG. 9B
FIG. 9C

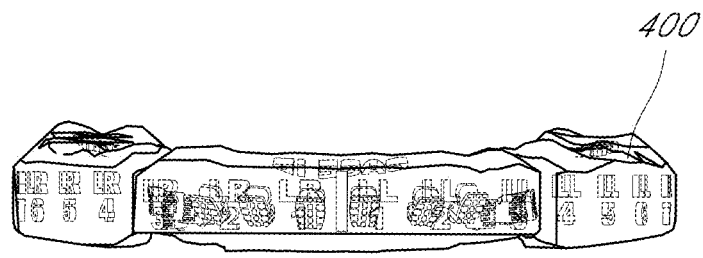
FIG. 10A
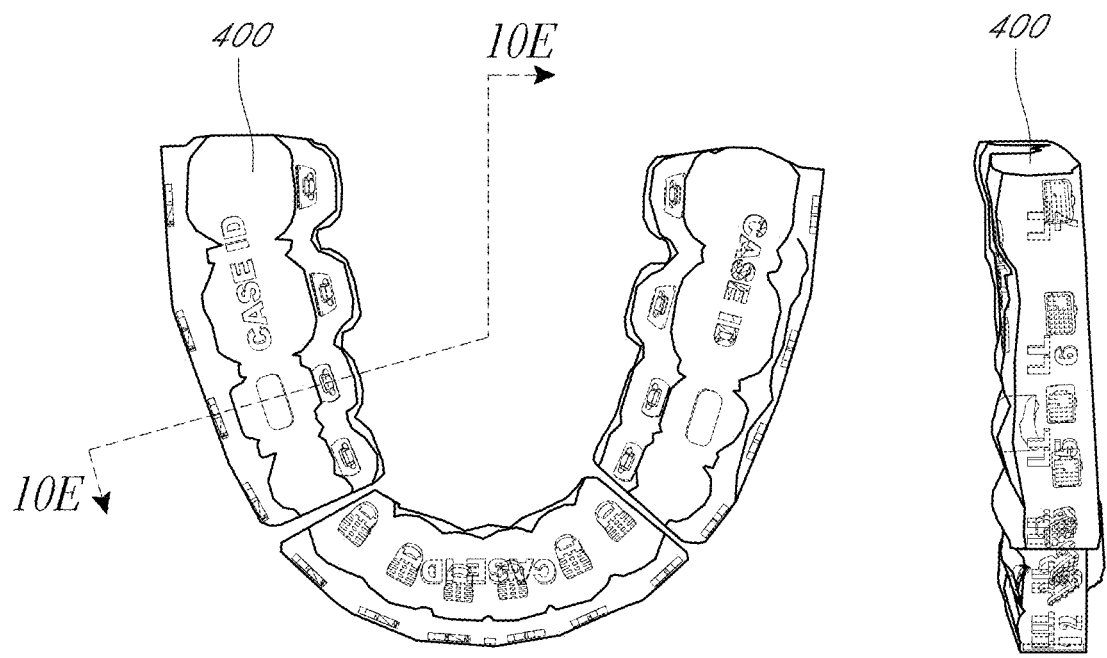
FIG. 10B
FIG. 10C

INDIRECT ORTHODONTIC BONDING SYSTEMS AND METHODS

INCORPORATION BY REFERENCE

This application claims the priority benefit of U.S. Provisional Application No. 62/928,587, filed Oct. 31, 2019, which is hereby incorporated by reference in its entirety herein. Any and all applications for which a foreign or domestic priority claim is identified in the Application Data Sheet as filed with the present application are hereby incorporated by reference under 37 CFR 1.57.

BACKGROUND

Field

This disclosure relates, in some aspects, to improved indirect bonding systems and methods for orthodontic bracket placement. The indirect bonding systems can improve bracket positioning with a number of features to advance the ease of use and minimize errors during bracket delivery.

SUMMARY

In some embodiments, disclosed herein are methods for fabricating an indirect bonding tray for placement of orthodontic brackets. The methods can involve, for example, providing a digitally defined orthodontic bracket setup, wherein digital brackets are positioned on a digital model of a patient's teeth. The method may include directly printing a 3-D printed indirect bonding tray, wherein multiple resin materials are used in the 3-D printed indirect bonding tray. The 3-D printed indirect bonding tray can include at least one well corresponding to at least one functional orthodontic bracket. In some embodiments, the indirect bonding tray need not necessarily be 3-D printed and can be created through other mechanisms.

The method can include modifying at least one parameter of the digital brackets in the digitally defined orthodontic bracket setup. In some embodiments, a functional orthodontic bracket is secured within each well of the 3-D printed indirect bonding tray. In some embodiments, the 3-D printed indirect bonding tray comprises a plurality of wells corresponding to a plurality of functional brackets. In some embodiments, the digitally defined orthodontic bracket setup and fabrication of the 3-D printed indirect bonding tray are performed at remote locations from each other. The method can include digitally moving the teeth from positions of malocclusion to positions of ideal occlusion. The method can include positioning digital brackets on surfaces of the teeth while in positions of malocclusion and moving the teeth to positions of ideal occlusion (e.g., a second position which may be an intermediate position between an initial position and a finalized position) while maintaining the positioning of the digital brackets on the surfaces of the teeth. In some embodiments, the 3-D printed indirect bonding tray comprises two separate 3-D printed resin materials. In some embodiments, the 3-D printed indirect bonding tray comprises a first resin material for the tray. In some embodiments, the 3-D printed indirect bonding tray comprises a second resin material for one or more tray markings. In some embodiments, the 3-D printed indirect bonding tray comprises a second resin material for one or more handles. In some embodiments, the 3-D printed indirect bonding tray comprises a second resin material encapsulated within a first resin material. In some embodiments, the 3-D printed indirect bonding tray comprises at least one biocompatible resin. In some embodiments, the 3-D printed indirect bonding tray comprises a midline marking. In some embodiments, the 3-D printed indirect bonding tray comprises an alphanumeric tooth marking. In some embodiments, the 3-D printed indirect bonding tray comprises a rigid handle.

Also disclosed herein, in some embodiments, are methods for placing orthodontic brackets onto teeth. The method can include providing an indirect bonding tray comprising wells comprising one or more functional orthodontic brackets, wherein the indirect bonding tray comprises two resin materials, wherein the indirect bonding tray is rapidly prototyped. In some embodiments, the method may include positioning the indirect bonding tray in contact with a patient's teeth. In some embodiments, the method may include transferring the functional orthodontic brackets from the indirect bonding tray to the patient's teeth. In some embodiments, the method may include printing instructive information to the indirect bonding tray.

Also disclosed herein are systems for use in fabricating an indirect bonding tray for placement of orthodontic brackets. The system can include a digital model of a patient's teeth. The system can include an indirect bonding tray comprising wells configured to contain one or more functional orthodontic brackets, wherein the indirect bonding tray comprises two resin materials. In some embodiments, the indirect bonding tray is digitally designed and customized per patient.

In some embodiments, a system can comprise, consist essentially of, or consist of any number of features disclosed herein.

In some embodiments, a method can comprise, consist essentially of, or consist of any number of features disclosed herein.

Further features and advantages of various embodiments contemplated by the present disclosure are described in detail below with reference to the accompanying drawings.

BRIEF DESCRIPTION OF THE DRAWINGS

These drawings are illustrative embodiments and do not present all possible embodiments.

FIGS. 6A-6F illustrate a 3-D printed indirect bonding tray of an upper arch of FIGS. 5A-5C.

FIGS. 7A-7F illustrate a 3-D printed indirect bonding tray of a lower arch of FIGS. 5A-5C.

FIGS. 9A-9C illustrate the 3-D printed bonding trays of FIGS. 6A-6C without tabs.

FIGS. 10A-10C illustrate the 3-D printed bonding trays of FIGS. 7A-7C without tabs.

DETAILED DESCRIPTION

Figure 1:
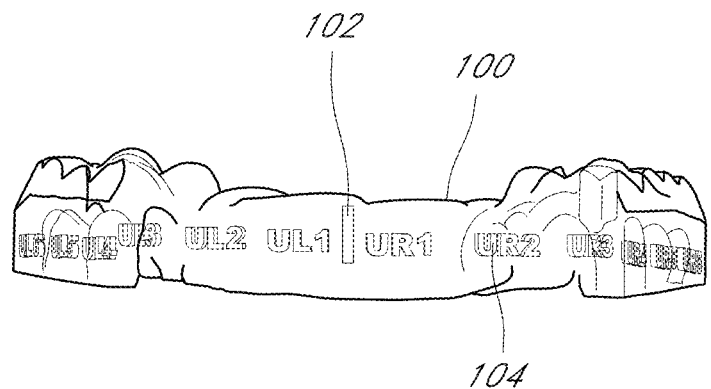
FIG. 1 illustrates a 3-D printed indirect bonding tray of the maxillary arch, according to some embodiments.

Indirect bonding (IDB) trays have been used in orthodontics to transfer the planned position of brackets from a model to a patient's teeth. This has traditionally been done by placing the functional brackets on a physical model (e.g., outside of the patient) and then transferring the brackets to the patient through an indirect bonding transfer tray technique.

Recently, the process of positioning brackets on teeth has been improved by digitally planning the position of brackets on a computer. This digital position of the bracket is then transferred to the patient through several methods. However, there are often drawbacks to the current methods of manufacturing indirect bonding trays. For instance, the material for forming an indirect bonding tray may not be well-suited for precision fabrication of intricate geometries directly from a digital model. As another example, there are often times human error in production such as placeholder bracket placement, which would propagate onto the indirect bonding tray and then to the patient. Improved systems and methods are needed.

In some embodiments, disclosed herein are improved systems and methods of creating indirect bonding trays. This method can use in some cases digital planning to place brackets in their correct position. The method can in some cases utilize a 3-D printed indirect bonding tray. The method can in some cases use biocompatible photopolymer resins to 3-D print an indirect bonding tray with features that facilitate bonding of orthodontic brackets for orthodontic treatment. The 3-D printed indirect bonding tray can advantageously improve manufacturability, and may lead to a throughput increase. The 3-D printed indirect bonding tray can improve bonding accuracy to a digitally pre-defined orthodontic bracket setup. The 3-D printed indirect bonding tray can have ease of identification and clinical application. The 3-D printed indirect bonding tray can have an improved aesthetic appearance. The 3-D printed indirect bonding tray can reduce variation in part appearance.

In some embodiments, disclosed herein are improvements on indirect bonding methods that utilize a moldable material over at least one non-functional placeholder orthodontic bracket attached to a tooth of the physical model. The moldable material can be a polyvinyl siloxane (PVS) material, which is used to mold over a 3-D printed model to capture bracket position. This PVS mold can form the indirect bonding tray. In contrast, the disclosed methods can utilize a digitally pre-defined orthodontic bracket setup to directly 3-D print the indirect bonding tray using multiple resin materials. While other 3-D printing indirect bonding trays may utilize a single resin material, multiple (e.g., 2, 3, 4, 5, or more) resin materials are utilized in systems and methods as disclosed.

In some embodiments, trays are digitally designed and customized per patient for direct 3-D printing. Trays can be designed to be printed using two or more separate 3-D print resin materials. In some embodiments, one material is used for the tray and a second material, which can be a different material in one or more respects, such as a different colored material is used for the tray markings and handles. In some embodiments, tray marking material is encapsulated within tray material for biocompatibility and for mitigation of inadvertent marking removal during use. Trays can be marked with the following for ease of clinical application: key midline markings on the upper and lower anterior tray segments; and key individual alphanumeric teeth markings indicating region and tooth position on all tray segments. Trays are designed and printed with rigid handles for ease of grip during clinical application. In some embodiments, the outer surface of the tray is contoured to patient-specific anatomy resulting in minimal profile for improved patient comfort and ease of clinical application. In some embodiments, a detachable tab on each tray segment indicates patient case ID for patient identification during both internal production processes and clinical use. In some embodiments, a custom patient-specific identifier is on each tray segment to indicate a patient case ID or other information for patient identification, which can be used for identification during both internal production processes and clinical use.

During digital design and viewing the target occlusion, space for additional curable adhesive and/or composite material can be added to the indirect bonding tray model to create a bite turbo. Bite turbos are small composite platforms placed on the inside of the upper front teeth, or on the biting surfaces of the back molars, to prevent full closure of the teeth. In some embodiments, the bite turbos prevent brackets from colliding into each other when a patient bites down. The bite turbos can be directional bite turbos in some cases.

Figure 2:
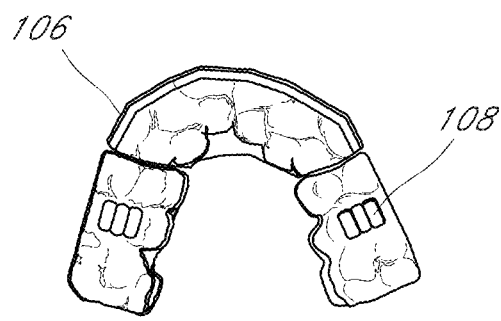
FIG. 2 illustrates another view of a 3-D printed indirect bonding tray of the maxillary arch of FIG. 1.

FIGS. 1 and 2 schematically illustrate a 3-D printed indirect bonding tray 100 of the maxillary arch. FIG. 1 illustrates a side view of the 3-D printed indirect bonding tray 100 and FIG. 2 illustrates a top view of the 3-D printed indirect bonding tray 100. FIG. 1 illustrates a key midline marking 102. FIG. 1 illustrates a key individual teeth markings 104. FIG. 2 illustrates that the 3-D printed indirect bonding tray 100 comprises an outer surface 106. The outer surface 106 can be contoured to the patient-specific anatomy. FIG. 2 illustrates rigid handles 108 for each of clinical application.

Figure 3:
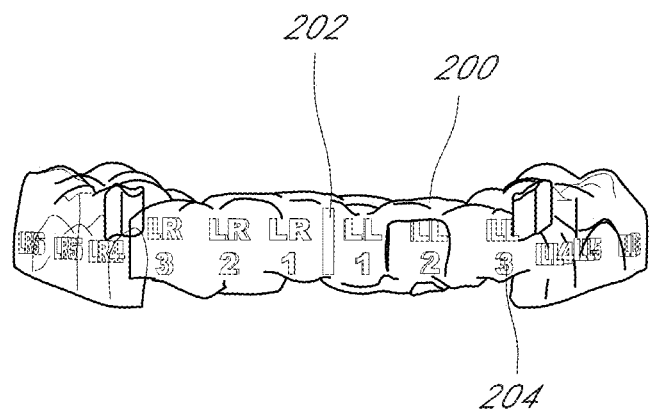
FIG. 3 illustrates a 3-D printed indirect bonding tray of the mandibular arch, according to some embodiments.
Figure 4:
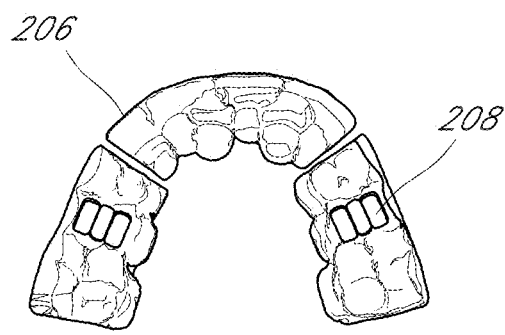
FIG. 4 illustrates another view of a 3-D printed indirect bonding tray of the mandibular arch of FIG. 3.

FIGS. 3 and 4 schematically illustrate a 3-D printed indirect bonding tray 200 of the mandibular arch. FIG. 3 illustrates a side view of the 3-D printed indirect bonding tray 200 and FIG. 4 illustrates a top view of the 3-D printed indirect bonding tray 200. FIG. 3 illustrates a key midline marking 202. FIG. 3 illustrates a key individual teeth markings 204. FIG. 4 illustrates that the 3-D printed indirect bonding tray 200 comprises an outer surface 206. The outer surface 206 can be contoured to the patient-specific anatomy. FIG. 4 illustrates rigid handles 208 for each of clinical application.

Figure 5A:
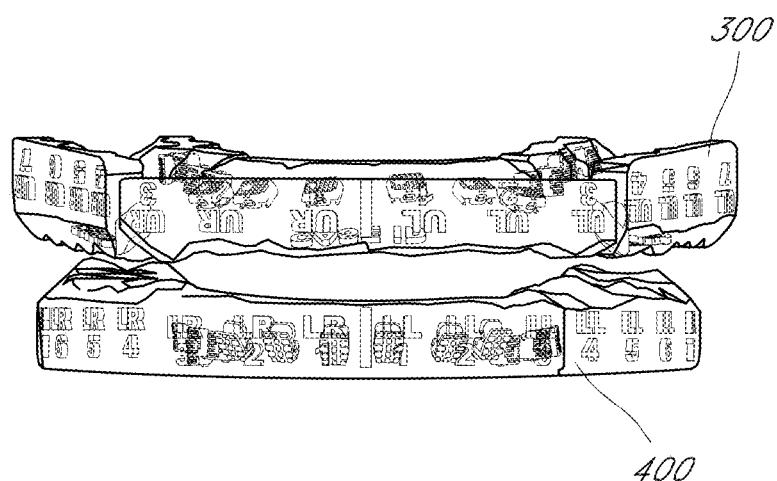
FIGS. 5A-5C illustrate 3-D printed indirect bonding trays, according to some embodiments.
Figure 5B:
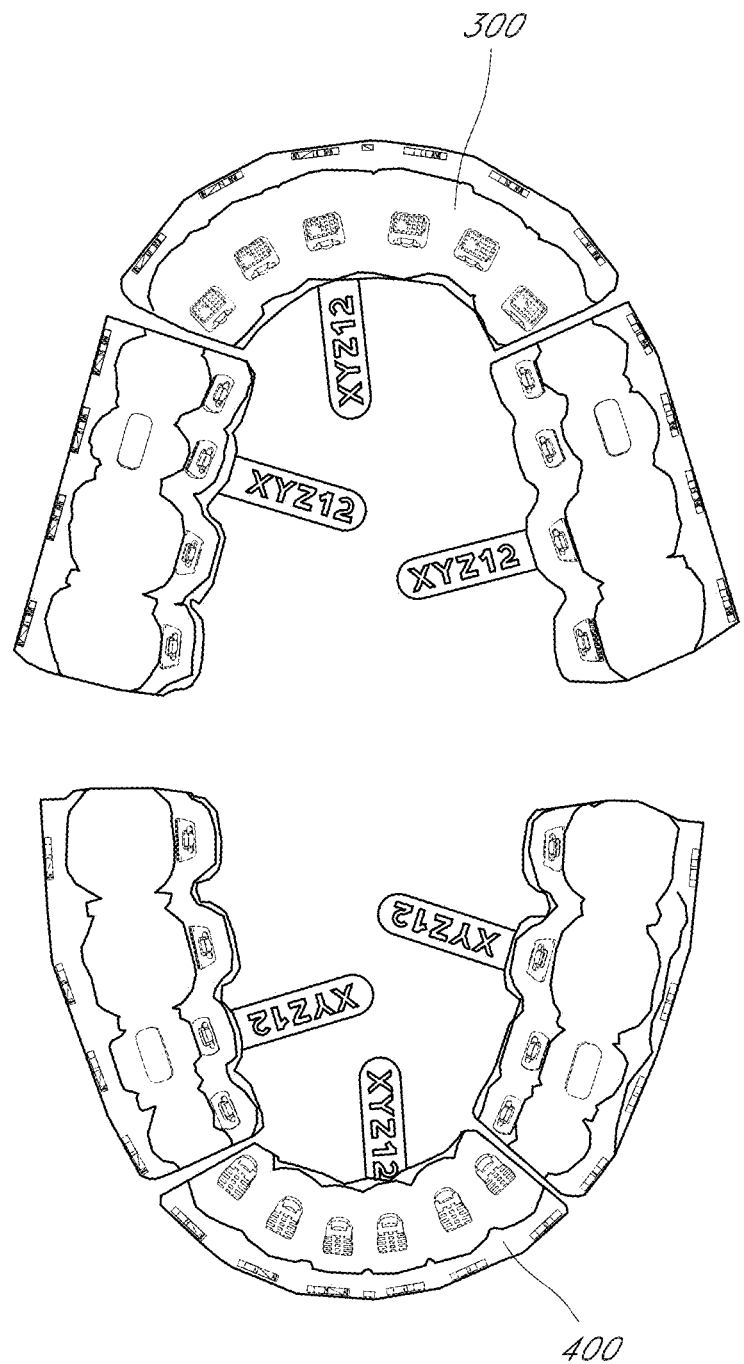
Figure 5C:
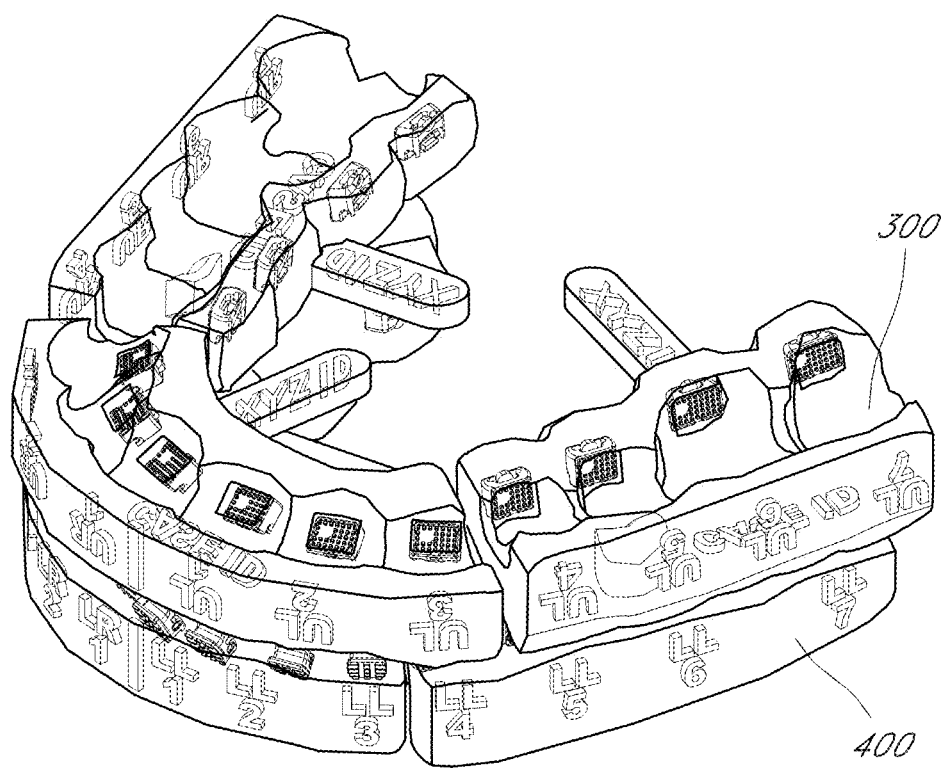
Figure 6D:
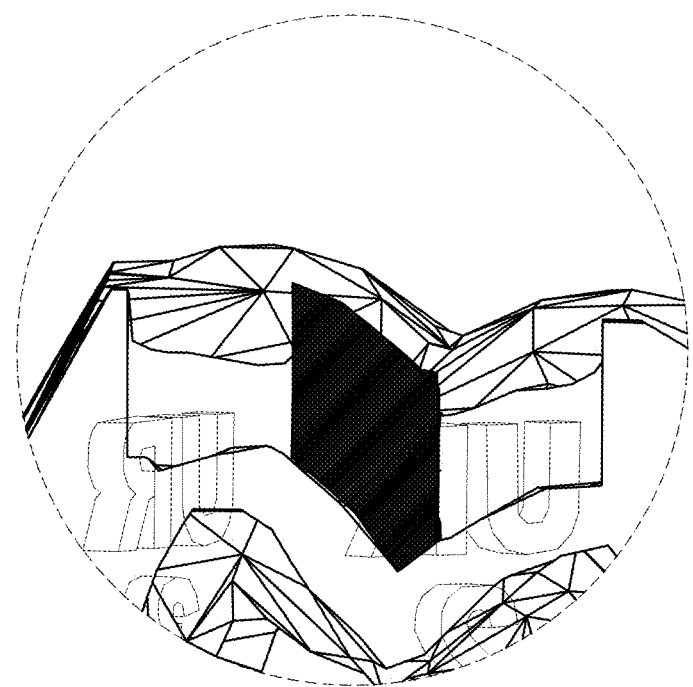
Figure 6E:
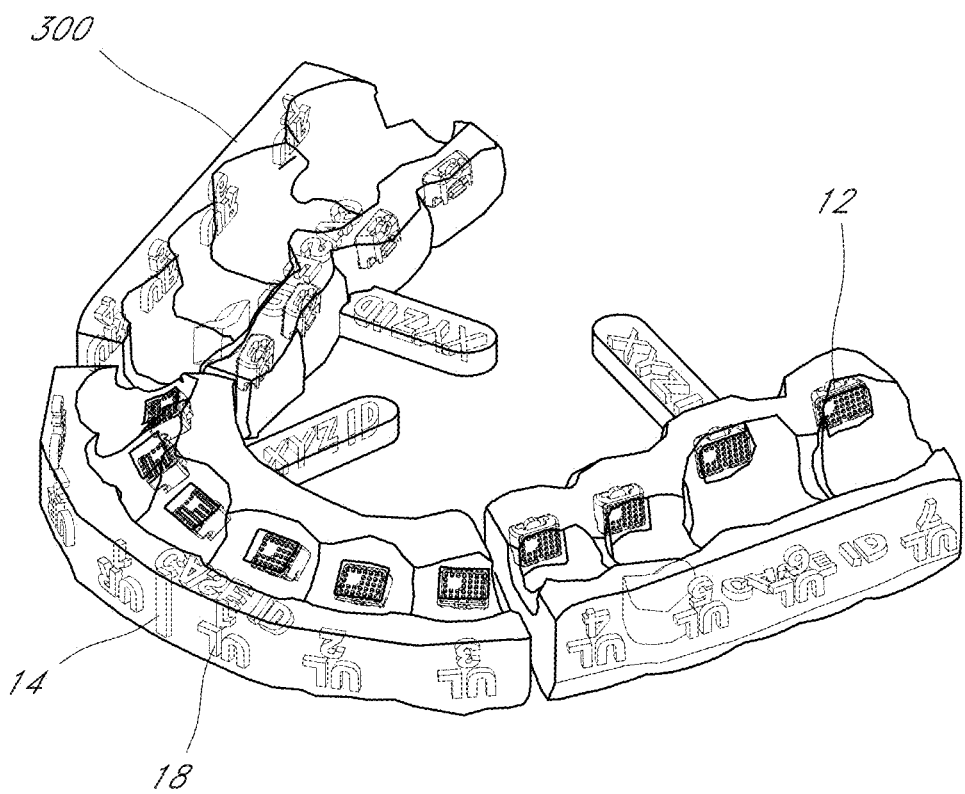
Figure 6F:
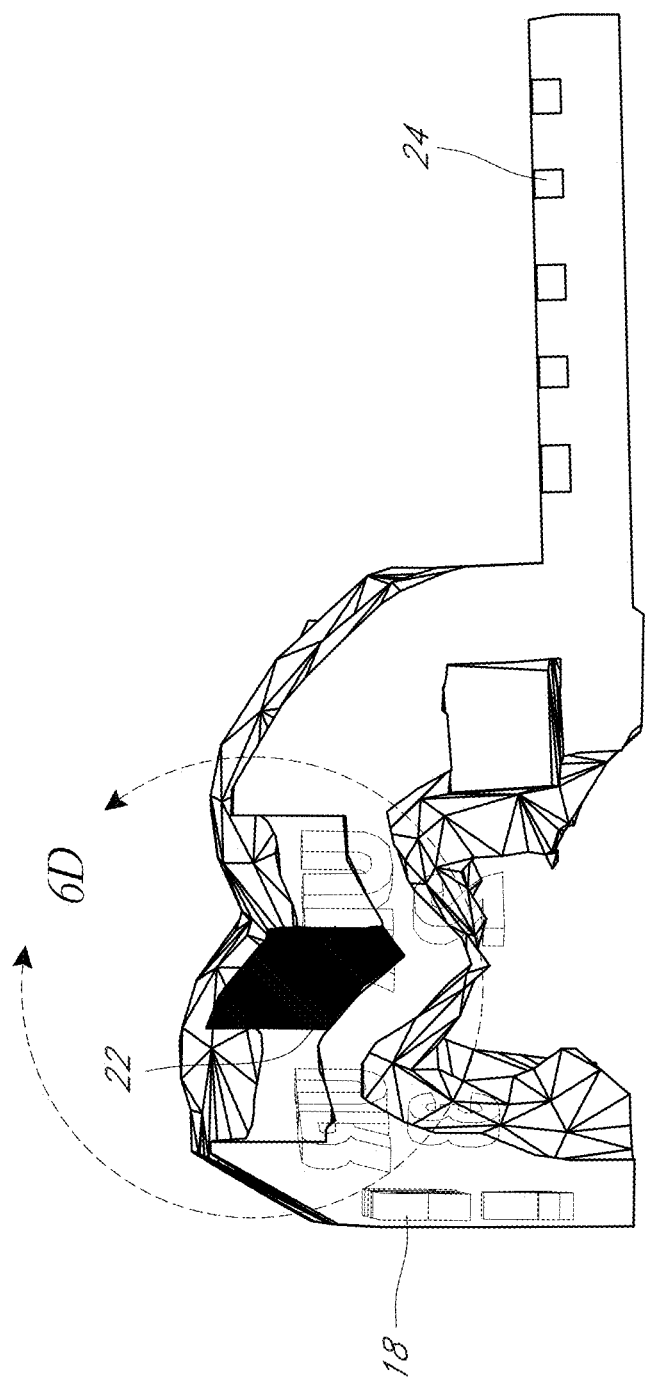
Figure 7D:
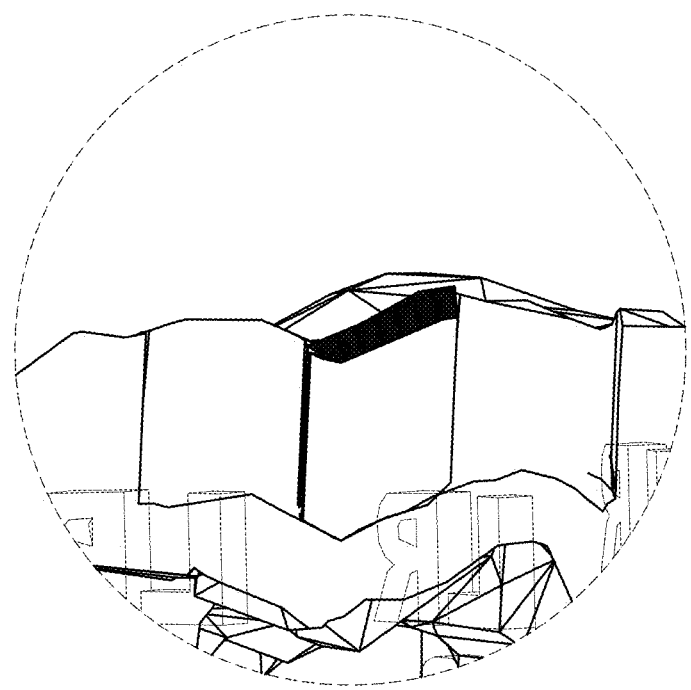
Figure 7E:
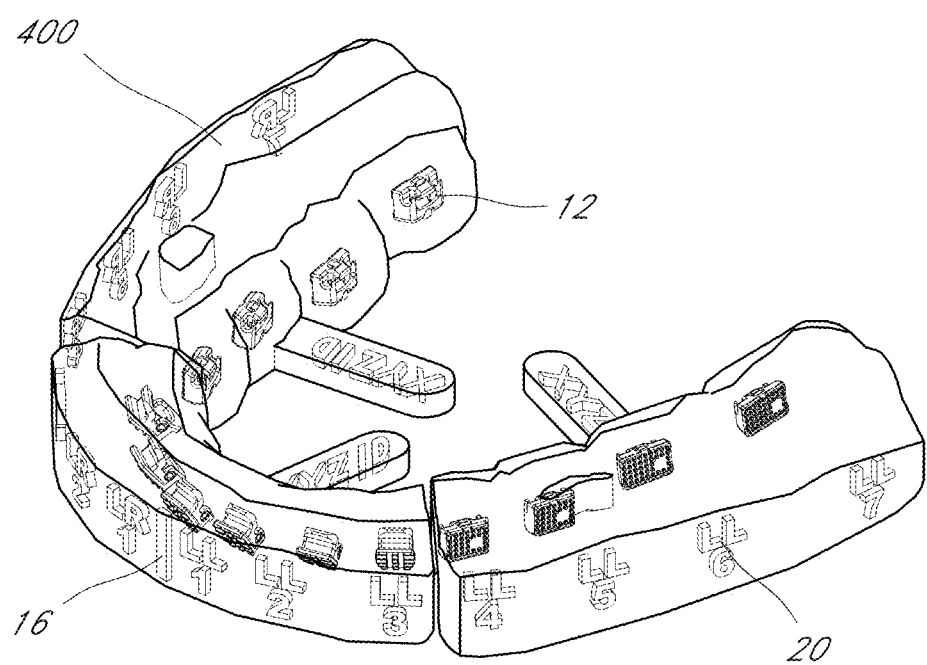
Figure 7F:
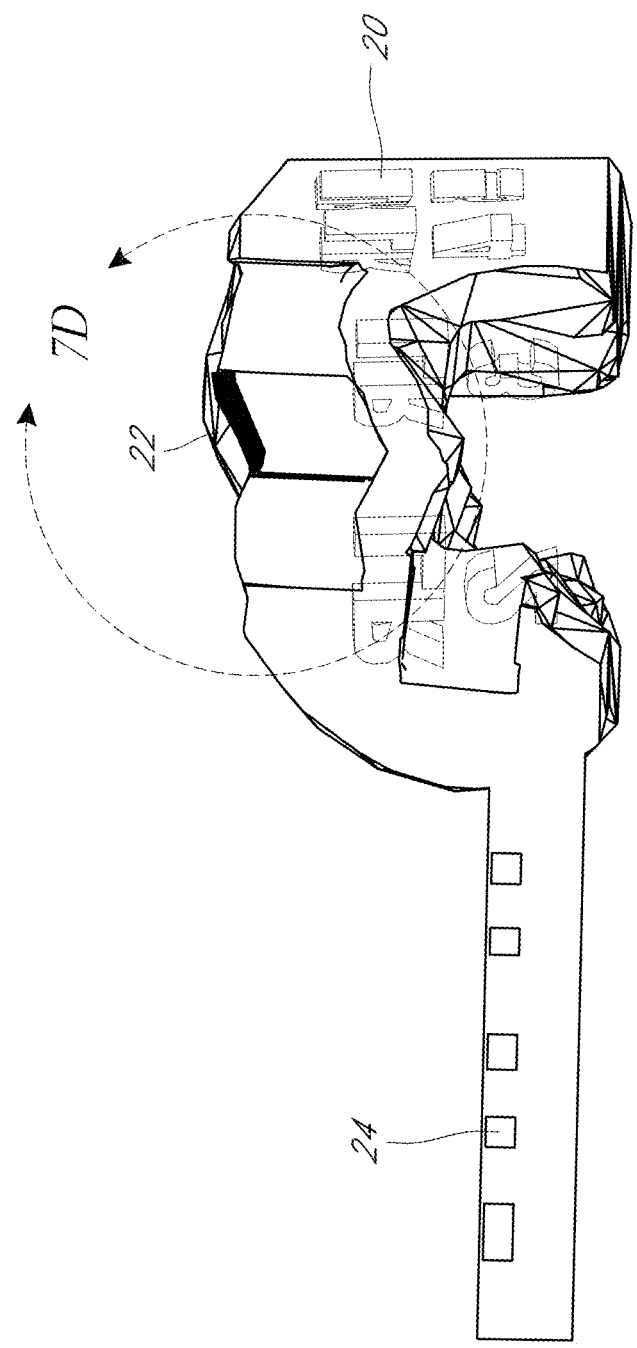
Figure 8A:
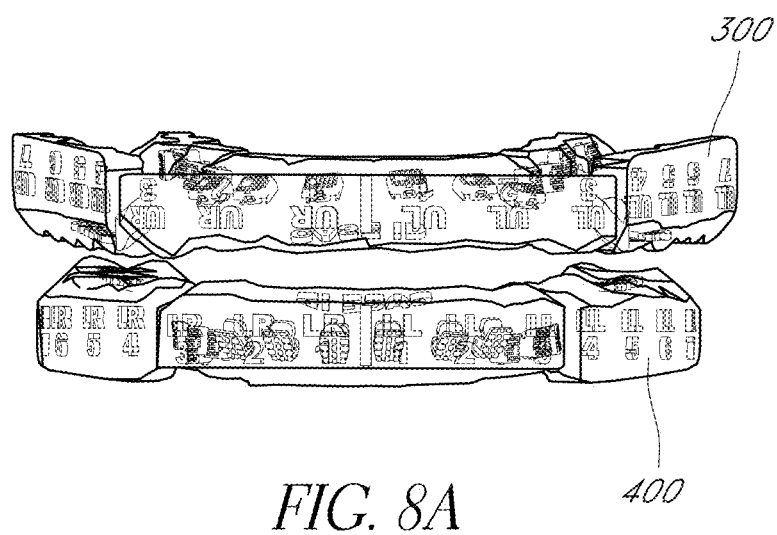
FIGS. 8A-8C illustrate the 3-D printed bonding trays of FIGS. 5A-5C without tabs, according to some embodiments.
Figure 8B:
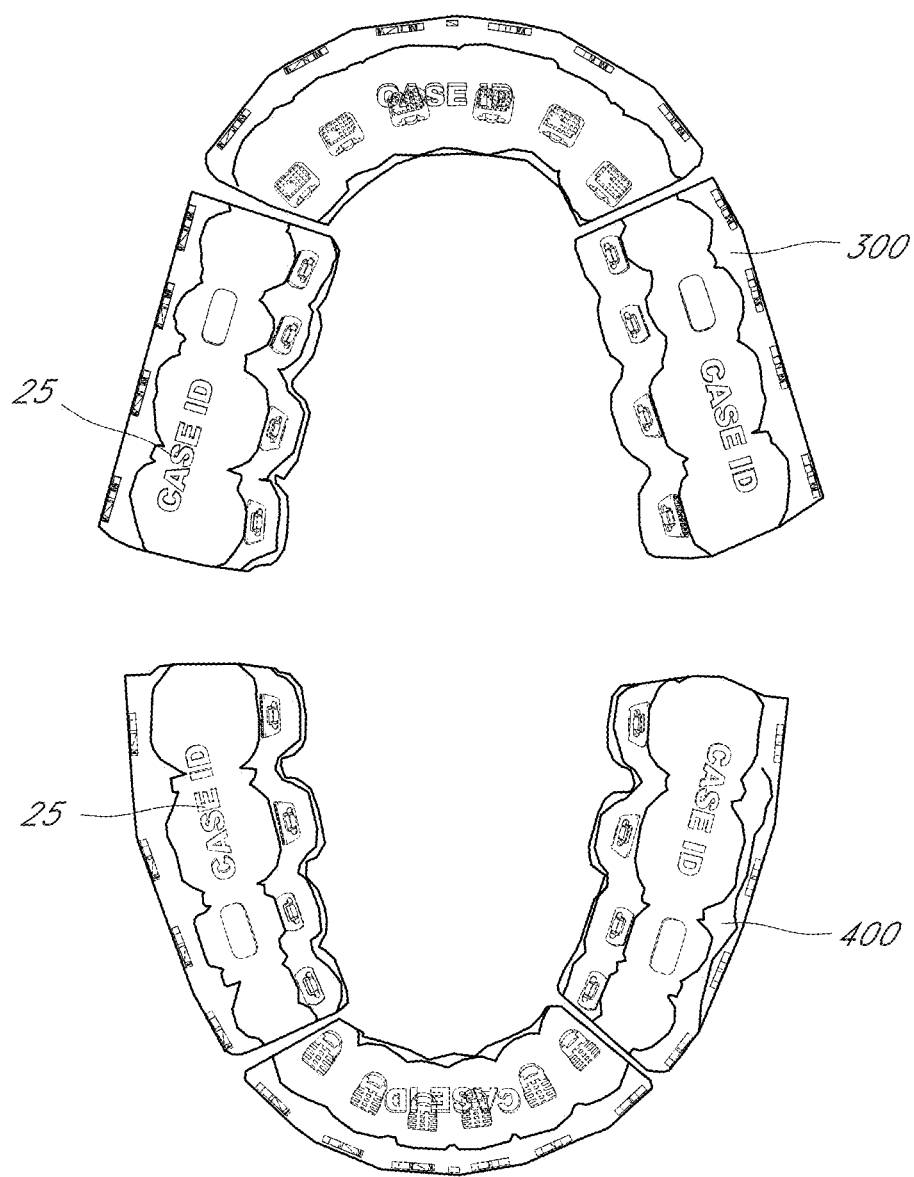
Figure 8C:
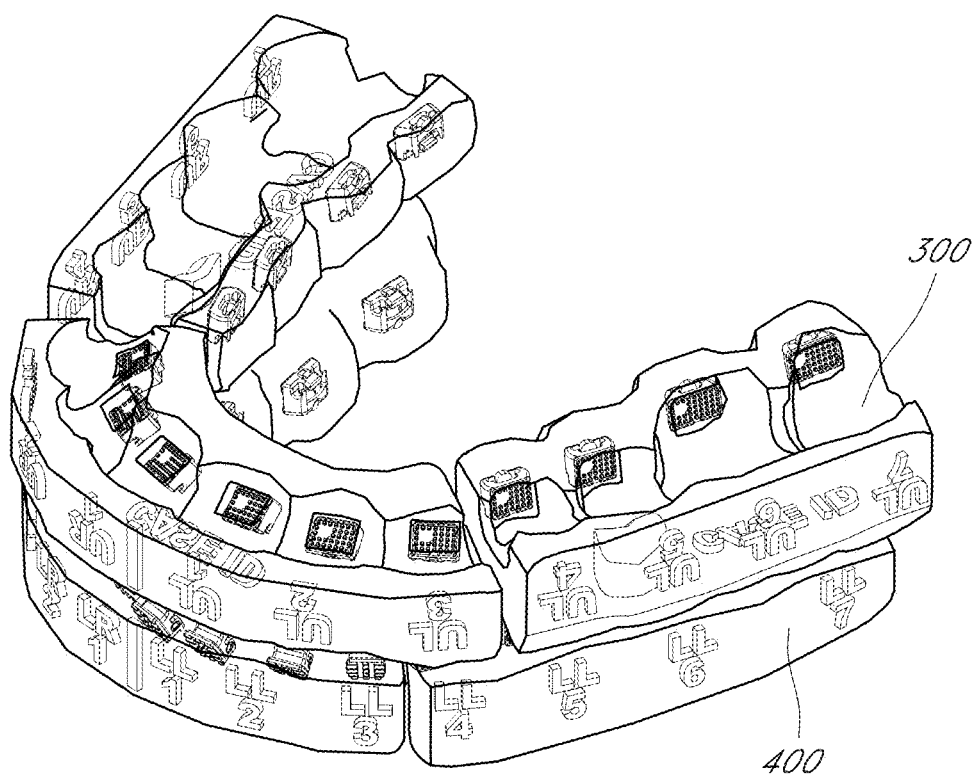
Figure 9D:
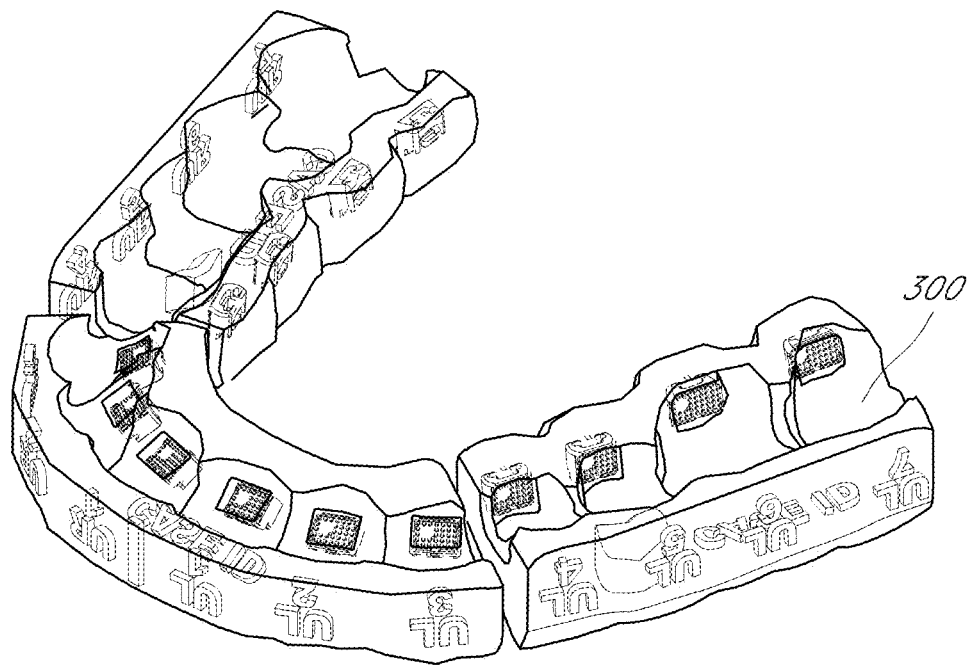
FIGS. 9D and 9E illustrate the 3-D printed bonding trays of FIGS. 6E and 6F, respectively, without tabs.
Figure 9E:
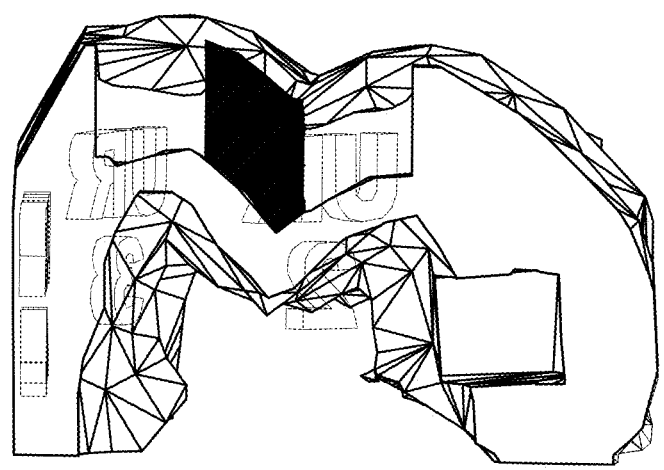
Figure 10D:
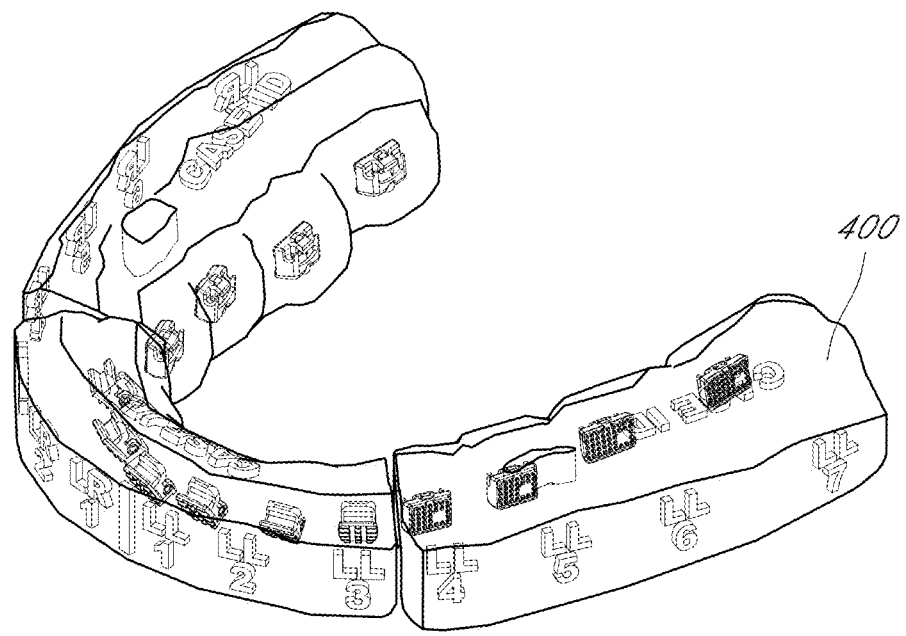
FIGS. 10D and 10E illustrate the 3-D printed bonding trays of FIGS. 7E and 7F, respectively, without tabs.
Figure 10E:
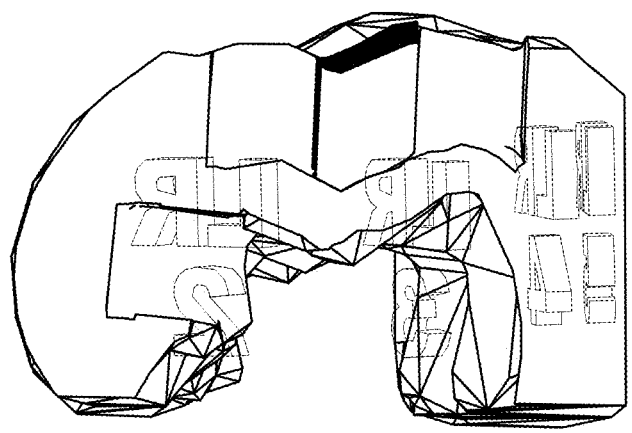

FIGS. 5A-5C illustrate 3-D printed indirect bonding trays 300 and 400, according to some embodiments. FIGS. 6A-6F illustrate the 3-D printed indirect bonding tray 300. FIGS. 7A-7F illustrate the 3-D printed indirect bonding tray 400.

The 3-D printed indirect bonding trays are utilized in conjunction with brackets. The brackets have various external surfaces or geometries. Each bracket can correspond to a digital representation of a bracket, for instance in bracket placement software. The functional brackets can be placed in the same exact position, or substantially similar location, as the digital brackets. The outline of the bracket interface with the individual tooth may be preserved to ensure proper alignment of the functional bracket with the patient's tooth during transfer. The digital teeth and digital brackets of the ideal occlusion model may be moved back onto the malocclusion digital model. The digital bracket position relative to the tooth may be maintained as the teeth are repositioned from a state of ideal occlusion (e.g., a second position of occlusion different than a first position of malocclusion) back to original state of malocclusion (e.g., a first position of malocclusion). The digital brackets and the malocclusion digital model can be combined into a single file for each arch.

The 3-D printed indirect bonding tray can be modeled. Features such as handles or tabs may be added to the indirect bonding tray model to aid in rapid prototyping. The features can facilitate fabrication of the indirect bonding tray and/or handling of the indirect bonding tray. For instance, the features may provide structural support to the indirect bonding tray during fabrication. In some embodiments, digital perforations may be added between one or more teeth. These perforations would allow the clinician to snap off individual teeth or groups of teeth to make sectional indirect bonding (IDB) trays.

The lab may rapid prototype this indirect bonding tray that includes the malocclusion digital indirect bonding tray configured to couple with functional brackets. Alternatively, the lab may send the final digital indirect bonding tray to the doctor (e.g., electronically send via the internet) to allow direct fabrication by the doctor.

Fabrication of the indirect bonding tray may be performed by a rapid prototyping means, such as 3-D printing, or any other suitable means known in the art. In some embodiments, the physical model may comprise the entire set, or only a subset of the patient's teeth. The subset of teeth may correspond to a segment of the dental arch. The indirect bonding tray may correspond in size (e.g., the length the tray extends along the dental arch) to the segment of the dental arch or may correspond to the entire arch but may not include teeth not selected as part of the subset.

FIGS. 5A-7F depict indirect bonding trays for 3-D printing. The brackets 10, 12 may be coupled to the indirect bonding tray prior to placement on the patient. The brackets 10, 12 can have different sizes or shapes dictated, at least in part, by the digital model of the bracket placement and the anatomy of the teeth.

The methods can utilize a digitally pre-defined orthodontic bracket setup to directly 3-D print the indirect bonding tray using multiple resin materials. In some methods, images of teeth may be obtained by using a digital intra-oral scanner, a cone-beam computed tomography (CBCT) X-ray scanner, or by taking polyvinyl siloxane (PVS) impressions, followed by pouring of study models and scanning of the study model. Digital images of teeth can be rendered in imaging software where each tooth image can be segmented from the whole dental arch image and then re-arranged in an expected alignment, a process known as virtual set-up of teeth.

In some methods, orthodontic bracket images may be digitally placed onto teeth in locations that fit the preference of the user. Bases of orthodontic brackets may be custom designed with the tooth side of the bases fitting perfectly to the tooth surfaces where orthodontic brackets are to be bonded, and the orthodontic bracket side of the bases may merge and connect with the base side of the orthodontic bracket. The virtual teeth set-up with the virtually designed orthodontic brackets may be sent to the user for approval and adjustments may be made according to the user's request. In some embodiments, the system includes a digital representation of a planned model comprising the patient's teeth and orthodontic brackets positioned on the patient's teeth in planned positions for orthodontic treatment.

Digital models of the indirect bonding trays can be rendered in imaging software where each indirect bonding tray can span the whole dental arch or can be segmented from the whole dental arch. The digital model of the indirect bonding tray can include one or more spaces or wells for accommodating the orthodontic brackets to be transferred to the patient's teeth. The one or more spaces or wells accept functional brackets that are transferred from the indirect bonding tray to the tooth. The digital model of the indirect bonding trays can be manufactured by any technique including 3-D printing. In some methods, indirect bonding trays can be manufactured from the digital model using casting, metal injection molding, 3-D printing, micromachining, any combination of generic mass production and customization techniques, and/or any direct digital manufacturing technique The 3-D printing process builds a 3-D object, typically by successively adding dots or layers of material. The 3-D printing process relies on a digital model, such as a CAD model or other digital medium, to provide instructions for the printing. The 3-D printing process allows for the production of complex shapes or geometries, such as the intricate wells of the indirect bonding trays. The 3-D printing process can also be referred to as additive manufacturing, since material is successively added to build the object. The 3-D printing process can encompass any technique known in the art, including fused deposition modeling (FDM) and fused particle fabrication (FPF). In some methods, the indirect bonding trays are fabricated using additive manufacturing techniques such as stereolithography (SLA or SL).

Conventional 3-D printing utilizes a single resin material. As described herein, multi-material printing allows the trays to advantageously be compositions of two or more resins. The trays can comprise heterogeneous mixtures of materials, such that each resin is separate or independent. In some embodiments, the indirect bonding tray does not contain a single resin. The indirect bonding tray is not homogenous in material in some cases. In some embodiments, the indirect bonding tray includes two or more separate and distinct resins. The two or more resins can include different colors or other visually distinct identifiers. The two or more resins can be visually identical. The two or more resins can have different material properties. The two or more resins can have the same material properties. The two or more resins can have different toughness or strength. The two or more resins can have different flexibilities or elasticities. The two or more resins can have separate and distinct locations within the indirect bonding tray. The two or more resins can have separate and distinct functions relating to the indirect bonding tray.

The 3-D printed indirect bonding tray can be comprised of various materials of different durometers and colors. Different durometers allows the creation of an indirect bonding tray that is sufficiently compliant to get around the teeth and seat properly. Different durometers allows the creation of an indirect bonding tray with added firmer segments that can serve specific purposes, such as an integrated handle that can be grasped by forceps for proper placement/seating. Different durometers can be used to reinforce segments that require additional stiffness. Different colors allow the creation of an indirect bonding tray that permits the addition of color marking for indicators of tooth position and proper placement of indirect bonding tray.

Trays are digitally designed and customized per patient for direct 3-D printing. Indirect bonding trays can be custom shaped to fit one or more of an individual patient's teeth. Indirect bonding trays may be custom made to fit to a particular patient's particular tooth or teeth. In some embodiments, portions of the indirect bonding tray may be made to fit a certain type of teeth for all patients. In some embodiments, portions of the indirect bonding tray may be made to fit all teeth indiscriminately. Indirect bonding trays may be custom designed with the tooth side of the tray fitting perfectly to the tooth surfaces where orthodontic brackets are to be bonded. Indirect bonding trays may be used to position the orthodontic bracket correctly to the tooth surface during bonding or rebonding of orthodontic brackets clinically.

Trays are designed to be printed using two separate 3-D print resin materials. The 3-D printed indirect bonding tray can be formed from any resin material. The resin material is dispensed by a 3-D printer (e.g., in droplets) according to an indirect bonding tray digital model. The resin materials can be utilized in any rapid prototype procedure, including 3-D printing. In some embodiments, the resin is photo-cured with UV light. Any other suitable application means may be used as well. The 3-D print resin materials are designed to be printed to cover the wells for the functional brackets and all or selected surfaces of the teeth. The 3-D print resin can be applied in layers or in a progressive manner to build the indirect bonding tray. The 3-D printing can create the wells that the orthodontic brackets 10, 12 can be placed into on the indirect bonding tray. In embodiments where the indirect bonding tray comprises only a segment of the patient's dental arch, the 3-D printer may form only that segment without completing the entire arch. Partial indirect bonding trays may be useful for performing bracket replacements and/or for subsequent placement of brackets that were initially infeasible to place for instance, due to physical interference such as overcrowding.

In some embodiments, two resin materials are utilized for the indirect bonding trays. One material is used for the tray. This first resin can have characteristics suited for the creation of the wells. This first resin can have characteristics suited for the retention of the functional brackets. This first resin can have characteristics suited for precisely locating the bracket relative to the tooth surface. Another material is used for another portion of the indirect bonding tray. This second resin can be used for the tray markings. This second resin can be used for the handles. This second resin can be used for any secondary function, such as to facilitate placement of the tray. This second resin can have a different color, for instance the first resin can be clear and the second resin can be colored or opaque. The first resin can form the tray. The tray can be made of translucent materials allowing curing of UV/light curable adhesives for the brackets. This second resin can have a different flexibility, for instance the first resin can be more flexible and the second resin can be more rigid. This second resin can have a different bending strength, for instance the first resin can be more bendable or flexible and the second resin can be more rigid.

In some embodiments, one material encapsulates another material. The first resin can encapsulate the second resin. The first resin can contact the patient and therefore be biocompatible. The second resin can be encapsulated such that the second resin need not be biocompatible. In some embodiments, the second resin need not be biocompatible so long as the second reside does not leach out into the first resin. In some embodiments, the tray marking material is encapsulated within tray material. The encapsulation can be for biocompatibility. In some methods and systems, non-biocompatible materials are used in an indirect bonding tray, by surrounding the non-biocompatible materials with biocompatible materials. There are opportunities for material properties for an indirect bonding tray that are not available in biocompatible materials. For example, an additive manufacturing process can include more than one material for labelling information directly embedded within the indirect bonding tray. In these methods, the indirect bonding tray can be designed to encapsulate the non-biocompatible material entirely by biocompatible materials. The encapsulation can also mitigate inadvertent marking removal during use. For instance, the encapsulation prevents removal of the key markings that help with placement.

Trays can including markings for ease of clinical application. In some embodiments, the 3-D printed indirect bonding tray may comprise indicia, including instructional information printed or otherwise marked on the 3-D printed indirect bonding tray. The information may comprise, for example, identification markers that include, for instance, information relevant to placing the proper tray in the proper location on the correct patient's teeth (e.g., tooth number position, upper or lower arch indicator, patient number, etc.). In some cases, the information may be 3-D printed onto the indirect bonding tray. For example, the 3-D printed indirect bonding tray may be modified with a relief, embossment, stamp, indentation, etc. of text or other markings indicative of the information. The information may be positioned, for example, in or onto a tooth well such that it can be seen even after placement of the functional orthodontic brackets 10, 12. The information may be sized (e.g., in area and/or depth) such that it does not significantly alter negative impression and, therefore, does not interfere with the proper fitting of the 3-D printed indirect bonding tray to the patient's teeth. In some cases, the corresponding wells of the 3-D printed indirect bonding tray may be colored (e.g., with an agent, ink, or paint) to make the information more readily visible. For example, the colored agent, ink, or paint may fill an indentation in the 3-D printed indirect bonding tray before drying such that it makes the information stand out. Residual agent, ink, or dye may be wiped clean from the surface of the 3-D printed indirect bonding tray. Additionally or alternatively, information may be transferred to an external surface of the indirect bonding tray by mating the 3-D printed indirect bonding tray with an additional tray which marks the 3-D printed indirect bonding tray. In some embodiments, the information may be directly transferred onto the 3-D printed indirect bonding tray once mated, such as a stamp. For example, the information may be written on the additional tray or a marker comprising the information may be attached to the additional tray. In some embodiments, the information may be in non-textual form. For example, the information may be a color or fiduciary marker. In some embodiments, the information can be contained within a barcode, passive or active RFID tag, or other elements that can be positioned in various locations similar to the indicia noted above.

The markings can include any markings to facilitate placement. As one example, key midline markings 14, 16 can be provided on the upper and lower anterior tray segments. The midline markings 14, 16 can be lines located on or within the 3-D printed indirect bonding tray. The lines can be solid or discontinuous, such as dashed. The upper and lower trays can include the same midline markings 14, 16, or the midline markings 14, 16 can be different for each tray. The midline markings 14, 16 can be a different color than the first resin forming the tray. The midline markings 14, 16 can comprise the second resin. The midline markings 14, 16 can be encapsulated within the first resin.

Key individual alphanumeric teeth markings can indicate region and tooth position on all tray segments. As another example, key alphanumeric teeth markings 18, 20 can be provided on the upper and lower anterior tray segments. The teeth markings 18, 20 can be numbers, letters, and/or symbols located on or within the 3-D printed indirect bonding tray. The teeth markings 18, 20 can correspond to industry accepted teeth identifications. The upper and lower trays can include the same format for teeth markings 18, 20, or the teeth markings 18, 20 can be a different format for each tray. In the illustrated example, the alphanumeric teeth markings include letters indicating the tray and numbers indicating the tooth, separated by a line. Other configurations of indicia are contemplated. The alphanumeric teeth markings 18, 20 can be a different color than the first resin forming the tray. The alphanumeric teeth markings 18, 20 can comprise the second resin. The alphanumeric teeth markings 18, 20 can be encapsulated within the first resin. FIGS. 6D, 6F, 7D, and 7F illustrate the positioning of the teeth markings 18, 20. The teeth markings 18, 20 can be positioned between the well for the tooth and the inside of the cheek.

Trays can be designed and printed with rigid handles for ease of grip during clinical application. As yet another example, key handles 22 can be provided on the upper and lower anterior tray segments. The handles 22 can be positioned on any surface of the tray. In the illustrated example, handles are positioned on the occlusal surface of the tooth. This position allows direct application of an upward or downward force in order to seat the 3-D printed indirect bonding tray against the surface of the teeth. The handles 22 can extend from any exterior surface of the main portion of the indirect bonding tray. In the illustrated example, two or more tray segments can include a handle 22. Other configurations of handles are contemplated, including any number of handles and any orientation of handles. The handles 22 can include the second resin. The handles 22 can be a different color than the first resin forming the tray. The handles 22 can be a different material than the first resin forming the tray, for instance the second resin forming the handles can be stronger than the first resin. The handles can be rigid, or at least more rigid than another portion of the tray. FIGS. 6D, 6F, 7D, and 7F illustrate the positioning of the handle 22. The handle 22 can be positioned over a well for the tooth, spaced apart from the occlusal surface of the tooth.

The outer surface of the tray can be contoured to patient-specific anatomy resulting in minimal profile for improved patient comfort and ease of clinical application. The 3-D printed indirect bonding tray can be shaped to avoid patient discomfort. The portion of the 3-D printed indirect bonding tray facing the gums can be minimized. The 3-D printed indirect bonding tray remains in place for a short duration, only for bracket placement. However, the digital model can be designed to closely fit the patient, for patient comfort during the duration of the procedure. A minimized profile also can reduce resin material, leading to more rapid production and a lower costs. The 3-D printed indirect bonding tray can include rounded or atraumatic ends or edges so as to avoid causing pain or discomfort to the patient during any transient contact with oral tissue of the patient's mouth.

Detachable tabs 24 on each tray segment can indicate patient case identification for patient identification during both internal production processes and clinical use. As yet another example, key tabs 24 can be provided on the upper and lower anterior tray segments. The tabs 24 can include alphanumeric labeling to identify the patient. The tabs 24 can extend from an exterior surface of the main portion of the indirect bonding tray. In the illustrated example, each tray can include three tabs 24, located opposite of the gums of the patient, corresponding to the number of segments of the tray. In some embodiments, each segment includes a tab 24. Other configurations of tabs 24 are contemplated, including any number of tabs 24 and any orientation of tabs 24. The tabs 24 can include the first resin, and provide an extension of the main portion of the indirect bonding tray. The tabs 24 can include the second resin, for instance for alphanumeric markings. The alphanumeric markings can be a different color than the first resin forming the tray. The tabs 24 can be detached by the clinician prior to use with a patient to facilitate comfort. The tabs 24 can be detached after verifying that the 3-D printed indirect bonding tray corresponds to the patient to be treated. The tabs 24 can be used to verify that each segment has the same patient identification. In some embodiments, the tabs 24 are not detachable. FIGS. 6D, 6F, 7D, and 7F illustrate the positioning of the tab 24. The tab 24 can be positioned inward from a well for the tooth, spaced apart from the lingual surface of the tooth.

In some embodiments, as illustrated in FIGS. 8A-10E a custom patient-specific identifier 25 is on each tray segment instead of including tabs 24 to indicate a patient case ID or other information for patient identification, which can be used for identification during both internal production processes and clinical use. The patient-specific identifier 25 can include alphanumeric labeling to identify the patient. In the illustrated example, each tray includes three patient-specific identifiers 25. In the illustrated example, each segment includes a patient-specific identifier 25. Other configurations are contemplated in which any number of patient-specific identifiers 25 are positioned on any surface of the tray segment. In the illustrated example, the patient-specific identifier 25 is positioned on the occlusal surface of the tray. The patient-specific identifier 25 can be a different color than the first resin forming the tray. In some embodiments, tabs 24 and patient-specific identifiers 25 are used together.

Any added features may be removed from the rapid prototyped indirect bonding tray as necessary. The features may be fabricated (e.g., with reduced cross sections) such that they allow easy and precise breakage of the feature from the remainder of the indirect bonding tray with application of a sufficient amount of manual force. The features can also be kept to be used as handles to hold the indirect bonding tray for later processes.

For rebonding specific brackets in case of debond, it may be preferential to have an indirect bonding tray segment for just one tooth in order to get accurate placement. Traditionally, this has been accomplished by sectioning the indirect bonding tray with a sharp cutting tool. In some embodiments, the indirect bonding tray design includes snappable segments between all, or some subset of teeth to allow the indirect bonding tray to be broken consistently into smaller segments. During the digital design of the indirect bonding tray, break lines and/or perforations are added through a cross section of the indirect bonding tray materials making it easy to snap off in defined segments. This could also be achieved by perforating with another technology such as lasers.

The 3-D printed indirect bonding tray can include many advantages over other trays. The 3-D printed indirect bonding tray can improve manufacturability. The tray can be precisely designed from a digital model to retain functional brackets. The 3-D printed indirect bonding tray can improve tolerances between the well and the bracket. Based on the process utilized, the 3-D printed indirect bonding tray can lead to a throughput increase. The manufacturing occurs independent of human skill, rather, the throughput is dependent on the number of 3-D printers and runtime. The 3-D printed indirect bonding trays can be mass-produced by simply scaling the productivity of the printers. The 3-D printed indirect bonding tray can improve bonding accuracy to a digitally pre-defined orthodontic bracket setup. The tray is mechanically produced to a higher level of accuracy than typically achievable by other techniques. In some embodiments, the 3-D printed indirect bonding tray can meet tolerances of the digital model +/−0.005" or +/−0.002" per inch, whichever is greater.

The 3-D printed indirect bonding tray comprises two resins, wherein each resin can be specifically designed for a function such as marking or handling. The 3-D printed indirect bonding tray allows ease of identification of the patient. The 3-D printed indirect bonding tray allows ease of identification of each segment of the tray. The 3-D printed indirect bonding tray allows ease of identification for each tooth relative to the tray. The markings can be encapsulated and easily visualized through the first resin. The two resin format can also improve the aesthetic appearance of the 3-D printed indirect bonding tray. The markings can be clear and crisp, having the level of precision of the printer. The handles can be symmetrically formed and properly placed to facilitate handling. The 3-D printed indirect bonding tray can be an intuitive and complete tool for the transfer of brackets. The 3-D printed indirect bonding tray reduces variation in part appearance in some embodiments. The 3-D printed indirect bonding trays, including subcomponents such as handles, tabs, and markings, can be digitally modeled and printed without manual human interference. These subcomponents can be consistent across trays. In some embodiments, the tray can be formed with interdental spaces, such that non-essential features/materials normally present in between the teeth are subtracted and thus not present on the 3-D printed indirect bonding tray. This can, in some cases, be advantageous to create an improved seal.

As described herein, the 3-D printed indirect bonding tray may include wells for fitting to a patient's teeth and wells for receiving one or more functional orthodontic brackets to be transferred to the patient's teeth. The wells of the teeth may merge with each other. Each dental arch may essentially form one large well or a plurality of wells larger than individual teeth. The wells for the brackets may also merge into the wells for the teeth. The wells for the brackets may be formed to match the external outline or geometry of the functional brackets based on the digital brackets. The bracket wells may cause the teeth wells to extend deeper into the printed material of the indirect bonding tray, such as in an occlusal and/or lingual direction. Although the brackets 10, 12 depicted herein are depicted as lingual orthodontic brackets, the methods and systems described herein may be equally applied to other arrangements of orthodontic devices, including buccal orthodontic brackets.

The lab or orthodontist may place the functional brackets 10, 12 securely inside the bracket wells in the indirect bonding tray with the bonding side of the brackets facing outward away from the printed material of the indirect bonding tray and toward the open well conformed to receive the patient's teeth.

Adhesives may be added on the bonding side of the 3-D printed indirect bonding tray. Adhesives may be added to the brackets 10, 12 after all the brackets are properly placed in the indirect bonding tray in some cases. The adhesives may be cured or partially cured prior to transferring the 3-D printed indirect bonding tray and/or during application of the 3-D printed indirect bonding tray to the patient's teeth. After allowing sufficient time for the functional brackets 10, 12 to securely bond to the patient's teeth, the 3-D printed indirect bonding tray may be removed from the patient's mouth leaving the functional brackets 10, 12 in place on the patient's teeth.

A problem with indirect bonding trays is managing the adhesive that is applied by the orthodontic practitioner to the brackets in the indirect bonding tray. If the indirect bonding tray and brackets are designed 100% flush with the face of the teeth to be bonded and if there is excess adhesive added, then there is no place for the adhesive to go and the adhesive can spread across the tooth surface or get trapped in the bracket spaces, known as flash. In some embodiments, the indirect bonding tray can include a flash release to channel away any excess materials when pressure is applied during the light curing and bonding process. The indirect bonding tray can be digitally designed with the flash release within the indirect bonding tray. The indirect bonding tray can be digitally designed with one or more channels that are positioned around the location of the bracket to allow the flow of adhesive if excess adhesive is applied, or too much pressure is applied to the indirect bonding tray during bonding.

A wide range of resin materials are available for the 3-D printed indirect bonding tray. The 3-D printer resin is typically a liquid solution. The solution can include different monomers and oligomers, as well as additives. The major chemical classes of materials include ABS plastic, PLA, HIPS, PETG, carbon fiber filled, ASA, polyamide (nylon), glass filed polyamide, epoxy resins, silver, titanium, stainless steel, bronze, brass, gold, steel, ceramics, wax, photopolymers, polycarbonate, TPE, thermoplastic polyurethane, and combinations thereof. The material of the different resins results in different material properties. In some embodiments, an opaque metal can be used for the indirect bonding tray with a chemically activated adhesive for the brackets instead of a UV/light curable adhesive given the light blocking quality of the opaque metal. In some embodiments, the resin material could include an acrylate or methacrylate resin. One example of a methacrylate monomer is the condensation product of bisphenol A and glycidyl methacrylate, 2,2'-bis [4-(3-methacryloxy-2-hydroxy propoxy)-phenyl]propane (Bis-GMA). Alternatively, BisGMA may be synthesized from the diglycidyl ether of bisphenol A and methacrylic acid. Other examples of resinous materials include the ring-opening polymerization of epoxides. Epoxy/(meth)acrylate containing compounds containing both epoxy and (meth)acrylate functionality can also be utilized, and obtained from reaction of multi-epoxide containing compound with one or less equivalent of (meth) acrylic acid, or reaction of hydroxyl containing (meth) acrylate with epichlorohydrin. Commercially available epoxy/methacrylate include 3,4-epoxy-cyclohexyl methyl methacrylate. Additional resin materials that can be used in some cases include bifunctional epoxy/acrylate material, and epoxy/acrylate oligomeric material made from the reaction product of a multi-epoxide containing compound and hydroxy (meth)acrylate.

Various other modifications, adaptations, and alternative designs are of course possible in light of the above teachings. For example, features including brackets disclosed in U.S. Pub. No. 2014/0120491 A1 to Khoshnevis et al., hereby incorporated by reference in its entirety, can be utilized or modified or use with embodiments as disclosed herein. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "transferring an orthodontic bracket" includes "instructing the transferring of an orthodontic bracket." The ranges disclosed herein also encompass any and all overlap, subranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A method for fabricating an indirect bonding tray for placement of orthodontic brackets, the method comprising:
providing a digitally defined orthodontic bracket setup, wherein digital brackets are positioned on a digital model of a patient's teeth; and
directly printing a 3-D printed indirect bonding tray, wherein multiple resin materials are used in the 3-D printed indirect bonding tray, the multiple resin materials comprising a first resin material and a second resin material with one or more tray markings, the second resin material encapsulated in the first resin material;
wherein the 3-D printed indirect bonding tray comprises at least one well corresponding to at least one functional orthodontic bracket.

2. The method of claim 1, further comprising modifying at least one parameter of the digital brackets in the digitally defined orthodontic bracket setup.

3. The method of claim 1, wherein a functional orthodontic bracket is secured within the at least one well of the 3-D printed indirect bonding tray.

4. The method of claim 1, wherein the 3-D printed indirect bonding tray comprises a plurality of wells corresponding to a plurality of functional orthodontic brackets.

5. The method of claim 1, wherein the digitally defined orthodontic bracket setup and printing of the 3-D printed indirect bonding tray are performed at remote locations from each other.

6. The method of claim 1, further comprising digitally moving the teeth from first positions of malocclusion to second positions of occlusion.

7. The method of claim 1, further comprising positioning the digital brackets on surfaces of the teeth in the digital model while in first positions of malocclusion and moving the teeth to second positions of occlusion while maintaining the positioning of the digital brackets on the surfaces of the teeth.

8. The method of claim 1, further comprising one or more handles, wherein the one or more handles comprise the second resin material.

9. The method of claim 1, wherein at least one of the multiple resin materials comprises at least one biocompatible resin.

10. The method of claim 1, wherein the one or more tray markings comprises a midline marking.

11. The method of claim 1, wherein the one or more tray markings comprises an alphanumeric tooth marking.

12. The method of claim 1, wherein the 3-D printed indirect bonding tray comprises a rigid handle.

13. A method for placing orthodontic brackets onto teeth, comprising:
providing an indirect bonding tray comprising wells comprising one or more functional orthodontic brackets, wherein the indirect bonding tray comprises two resin materials, the two resin materials comprising a first resin material and a second resin material with one or more tray markings, the second resin material encapsulated in the first resin material, wherein the indirect bonding tray is rapidly prototyped;
positioning the indirect bonding tray in contact with a patient's teeth; and
transferring the one or more functional orthodontic brackets from the indirect bonding tray to the patient's teeth.

14. The method of claim 13, wherein the one or more tray markings comprises instructive information.

* * * * *